(12) United States Patent
Yoshida

(10) Patent No.: US 6,295,124 B1
(45) Date of Patent: Sep. 25, 2001

(54) RANGEFINDER APPARATUS

(75) Inventor: Hideo Yoshida, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/448,464

(22) Filed: Nov. 24, 1999

(30) Foreign Application Priority Data

Nov. 25, 1998 (JP) ................................................ 10-334253

(51) Int. Cl.[7] ............................ G01C 3/00; G02B 7/04; G03B 13/00
(52) U.S. Cl. ..................... 356/3.04; 250/201.6; 396/106; 396/109
(58) Field of Search ..................... 396/106, 109; 356/3.01–3.16; 250/201.6

(56) References Cited

U.S. PATENT DOCUMENTS

| | | | |
|---|---|---|---|
| Re. 36,895 | * 10/2000 | Tsuru et al. | ............................ 396/109 |
| 5,051,767 | * 9/1991 | Honma et al. | |
| 5,128,529 | * 7/1992 | Nagaoka et al. | .................. 250/201.6 |
| 5,321,460 | 6/1994 | Yoshida | .................................. 354/403 |
| 5,617,174 | * 4/1997 | Mikami | ................................. 396/106 |
| 5,943,515 | * 8/1999 | Omura | ................................. 396/106 |

* cited by examiner

Primary Examiner—Stephen C. Buczinski
(74) Attorney, Agent, or Firm—Leydig, Voit & Mayer, Ltd.

(57) ABSTRACT

In the rangefinder apparatus in accordance with the present invention, an infrared emitting diode (IRED) having four light-emitting areas projects a first correction beam when only a first light-emitting area emits light, a reference beam when the first and second light-emitting areas emit light, and a second correction beam when all of the first to fourth light-emitting areas emit light. These three kinds of beams have emission light intensity distributions different from each other and an identical emission center-of-gravity position with respect to the base-length direction. The three kinds of beams are successively projected to an object at a distance to be measured, to yield respective distance information items, according to which a beam eclipse correction is carried out.

15 Claims, 38 Drawing Sheets

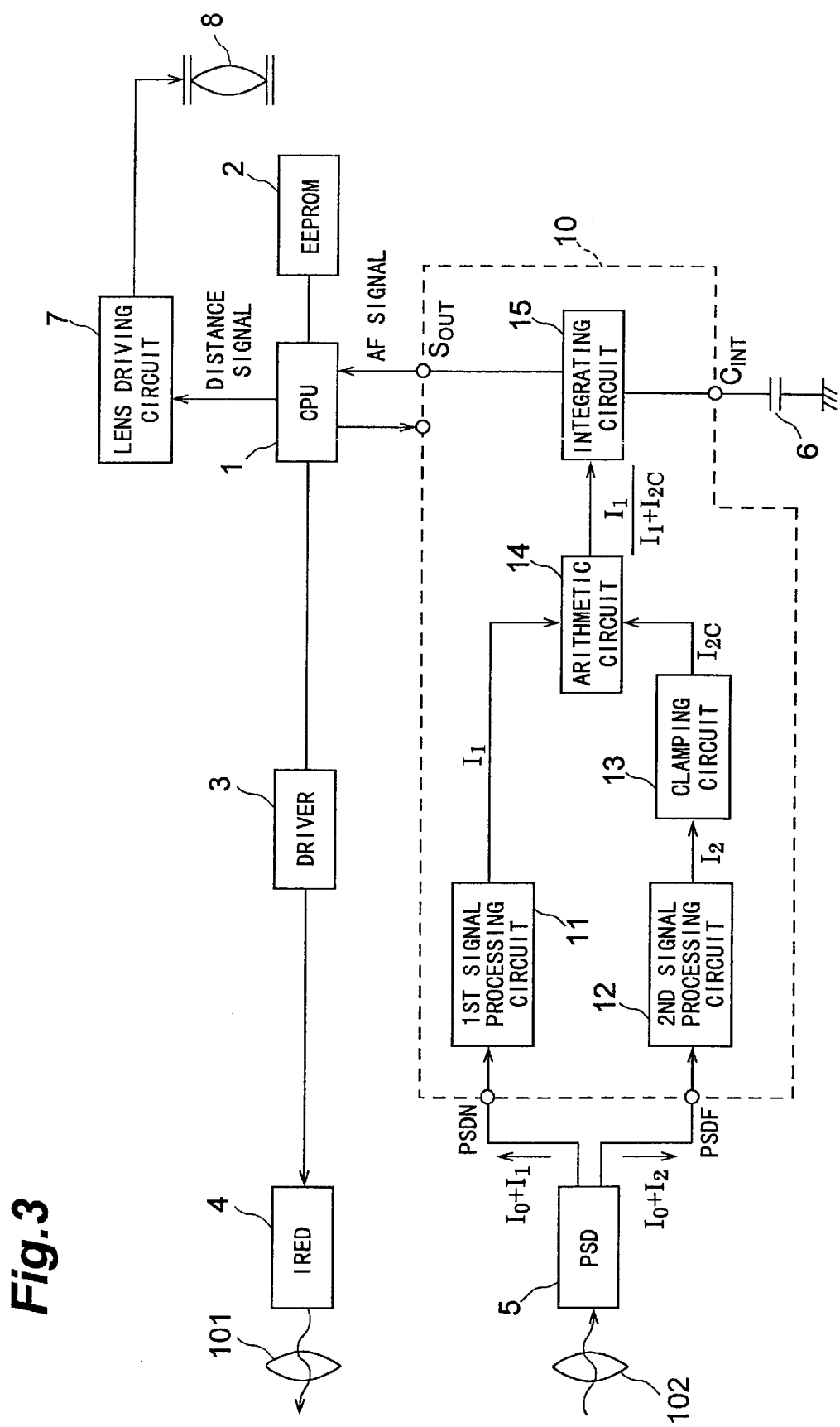

RANGEFINDER APPARATUS

BACKGROUND OF THE INVENTION

1. Field of the Invention

The present invention relates to a rangefinder apparatus for measuring the distance to an object; and, in particular, to an active type rangefinder apparatus suitably used in a camera or the like.

2. Related Background Art

In active type rangefinder apparatus used in cameras and the like, a light-projecting section projects a beam toward an object to be measured (object to be photographed), the part of beam reflected by the object is received by a position sensitive detector (PSD) in a light-receiving section, and the distance to the object is measured (range-finding is effected) according to a signal outputted from the PSD. FIG. 1 is a view showing an arrangement of the front face of a camera. As depicted, a finder 9 and a lens mount 8A holding a taking lens 8 are disposed in the front face portion of the camera body. As a rangefinder apparatus, a light-projecting device 4 and a PSD 5 are disposed in alignment with the sidewise direction, i.e., base-length direction 50, on the upper side of the lens mount 8A.

FIGS. 2A and 2B are explanatory views of range-finding by the light-projecting device 4 and PSD 5. As shown in FIG. 2A, when the object to be measured is located at position $P_1$, then the reflected light of the beam projected to the object from the light-projecting device 4 is received, by way of a light-receiving lens 5A, at position $p_1$ on the PSD 5. When the object is located at position $P_2$, then the reflected light of the beam projected to the object from the light-projecting device 4 is received, by way of the light-receiving lens 5A, at position $p_2$ on the PSD 5. Then, as shown in FIG. 2B, the center-of-gravity position 400 of the beam 300 received by the PSD 5 is detected, and the distance to the object is detected according to thus detected center-of-gravity position 400.

SUMMARY OF THE INVENTION

However, the inventor has found that the above-mentioned conventional rangefinder apparatus has the following problems. Namely, if the beam projected from the light-projecting device 4 toward the object to be measured does not completely impinge on the object, then a beam eclipse will occur in the reflected beam received by the PSD 5. The center-of-gravity position 401 of the beam 301 received by the PSD 5 when the beam eclipse occurs differs from the center-of-gravity position 400 of the beam 300 received by the PSD 5 when no beam eclipse occurs. Therefore, the distance to the object detected when the beam eclipse occurs becomes erroneous.

Also, as long as the beam received by the PSD 5 has a constant size, the shorter is the distance between the light-projecting device 4 and the light-receiving lens 5A in the base-length direction 50, the greater becomes the difference occurring in the measured distance value, whereby fluctuations in the center-of-gravity position caused by beam eclipses yield greater range-finding errors.

In order to overcome the above-mentioned problems, it is an object of the present invention to provide a rangefinder apparatus which can carry out accurate range-finding even when a beam eclipse occurs.

The rangefinder apparatus in accordance with the present invention comprises: (1) a light-projecting section for successively projecting toward an object to be measured a reference beam, a first correction beam, and a second correction beam having an identical emission center-of-gravity position with respect to a base-length direction and respective emission light intensity distributions different from each other; (2) a light-receiving section for receiving reflected light of the beam projected to the object from the light-projecting section at a light-receiving position corresponding to a distance to the object, and outputting distance information corresponding to the light-receiving position; and (3) correcting means which determines a correction value by correcting a beam eclipse with reference to a correction expression according to respective distance information items outputted from the light-receiving section when the beam projected from the light-projecting section is the reference beam, the first correction beam, and the second correction beam, and adds the correction value to the distance information outputted from the light-receiving section when the projected beam is the reference beam, so as to determine the distance to the object.

According to this rangefinder apparatus, the reference beam, the first correction beam, and the second correction beam having an identical emission center-of-gravity position with respect to the base-length direction and respective emission light intensity distributions different from each other are successively projected from the light-projecting section toward the object to be measured. The reflected light of each beam projected to the object by the light-projecting section is received by the light-receiving section at the light-receiving position corresponding to the distance to the object, and distance information corresponding to the light-receiving position is outputted therefrom. Then, the correcting means determines a correction value by correcting the beam eclipse with reference to a correction expression according to respective distance information items outputted from the light-receiving section when the beam projected from the light-projecting section is the reference beam, the first correction beam, and the second correction beam, and adds the correction value to the distance information outputted from the light-receiving section when the projected beam is the reference beam, so as to determine the distance to the object.

In particular, it is preferred that the emission light intensity distribution of at least one of the reference beam, the first correction beam, and the second correction beam with respect to the base-length direction be asymmetrical about the emission center-of-gravity position. In this case, the angular range where the beam eclipse correction is appropriately carried out can be widened in a laterally symmetrical manner.

In the rangefinder apparatus in accordance with the present invention, the correction expression may be determined beforehand according to a correlation value (e.g. difference) among distance information items outputted from the light-receiving section with respect to respective light-projecting angles of the reference beam, first correction beam, and second correction beam projected from the light-projecting section. In this case, the beam eclipse correction is appropriately effected in the correcting means. In particular, the correction expression may comprise a plurality of expressions different from each other in respective partial ranges into which a range available by the correlation value is divided. Also, the correcting means may select one of a plurality of expressions different from each other in respective partial ranges with reference to switching standards different from each other according to whether the beam eclipse is generated on the right side or left side. In these cases, an accurate beam eclipse correction is possible.

In the rangefinder apparatus in accordance with the present invention, the correcting means may correct the beam eclipse only if the difference between respective distance information items outputted from the light-receiving section when the beam projected from the light-projecting section is the reference beam, the first correction beam, and the second correction beam is not smaller than a first reference value. In this case, unnecessary corrections are not effected, whereby the processing time is shortened, or the range-finding error would not increase upon carrying out corrections. A weighted-averaging means may further be provided so as to weight, if the above-mentioned difference is smaller than the first reference value, two or more distance information items among respective distance information items outputted from the light-receiving section when the beam projected from the light-projecting section is the reference beam, the first correction beam, and the second correction beam according to respective emission light intensities of the beams, so as to attain a weighted average. In this case, unnecessary corrections are not effected, whereby the processing time is shortened, and the range-finding accuracy would improve.

In the rangefinder apparatus in accordance with the present invention, the correcting means may add the correction value to the distance information outputted from the light-receiving section in response to the reference beam only when the correction value is not greater than a second reference value, so as to determine the distance to the object. In this case, the beam eclipse correction is effected only when the correction value is within an appropriate range, whereby the correction is prevented from operating erroneously. In particular, it is preferable that the second reference value be set with reference to the distance to the object obtained according to the result yielded when the correction value is added to the distance information outputted from the light-receiving section in response to the reference beam. In this case, the correction is further effectively prevented from operating erroneously.

In the rangefinder apparatus in accordance with the present invention, the correcting means may carry out the beam eclipse correction according to distance information before being rounded to a predetermined value even if the distance to the object is at a predetermined distance or longer. As a consequence, an accurate beam eclipse correction can be effected.

In the rangefinder apparatus in accordance with the present invention, the light-projecting section may lastly project one of the first and second correction beams. In this case, it can be determined whether or not the beam eclipse correction is necessary before projecting the above-mentioned one beam. If not, then it is unnecessary to project the above-mentioned one beam, whereby the range-finding time can be shortened.

The light-receiving section of the rangefinder apparatus in accordance with the present invention may comprise: (1) light-receiving means for receiving reflected light of the beam projected to the object from the light-projecting section at a light-receiving position on a position sensitive detector corresponding to the distance to the object, and outputting a signal corresponding to the light-receiving position; (2) arithmetic means for carrying out an arithmetic operation according to the signal outputted from the light-receiving means and outputting a signal corresponding to the distance to the object; and (3) integrating means, having an integrating capacitor, for charging or discharging in response to the signal outputted from the arithmetic means the integrating capacitor at a reference voltage, and outputting distance information according to the result of integration.

In this case, the reflected light of the beam projected to the object from the light-projecting section is received by the light-receiving means at a light-receiving position on the position sensitive detector corresponding to the distance to the object, and a signal corresponding to the light-receiving position is outputted therefrom. The arithmetic means carries out an arithmetic operation according to the signal outputted from the light-receiving means, and outputs a signal corresponding to the distance to the object. The integrating means charges or discharges the integrating capacitor in response to the signal outputted from the arithmetic means, so as to integrate the signal outputted from the arithmetic means, and outputs distance information according to the result of integration. The light-projecting section having such light-receiving means, arithmetic means, and integrating means is preferable as the light-projecting section in the rangefinder apparatus in accordance with the present invention.

In particular, it is preferred that respective integration times in the integrating means when the beam projected from the light-projecting section is the first and second correction beams be shorter than the integration time in the integrating means when the beam projected from the light-projecting section is the reference beam. In this case, the accuracy of beam eclipse correction can be enhanced as the integration time for the reference beam is elongated, and the total range-finding time can be shortened as the integration time for each of the first and second correction beams is shortened.

It is also preferable that charging means for charging, before the integration by the integrating means, the integrating capacitor with the reference voltage or excessively charging the integrating capacitor with a voltage higher than the reference voltage and then charging it with the reference voltage further be provided such that, at each of times when second and third beams among the reference beam, the first correction beam, and the second correction beam are projected from the light-projecting section, the charging means does not charge the integrating capacitor at all or charges the integrating capacitor for a time shorter than the charging time of the integrating capacitor by the charging means when the first beam is projected from the light-projecting section. The total range-finding time can be shortened in this case as well.

The rangefinder apparatus in accordance with the present invention may further comprise a finder, having a target mark with a size corresponding to the size of the reference beam projected to the object from the light-projecting section, for visually identifying the position of each beam projected to the object from the light-projecting section according to the target mark. In this case, the photographer can securely capture the aimed object in focus.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a configurational view of the rangefinder apparatus in accordance with an embodiment of the present invention;

DESCRIPTION OF THE PREFERRED EMBODIMENTS

In the following, embodiments of the present invention will be explained in detail with reference to the accompanying drawings. Here, in the explanation of the drawings, constituents identical to each other will be referred to with letters or numerals identical to each other, without their overlapping descriptions being repeated.

Figure 1:
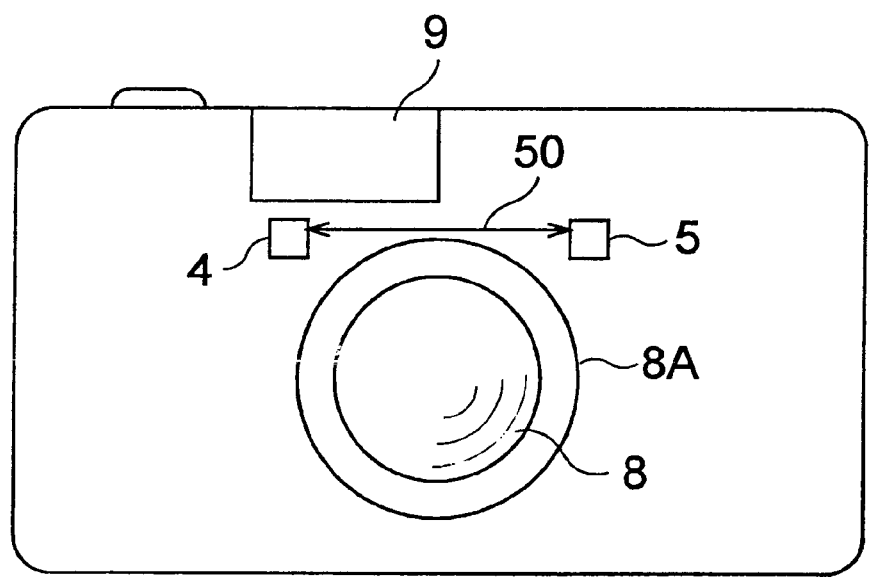
FIG. 1 is a view showing the arrangement of the front face of a camera.
Figure 2A:
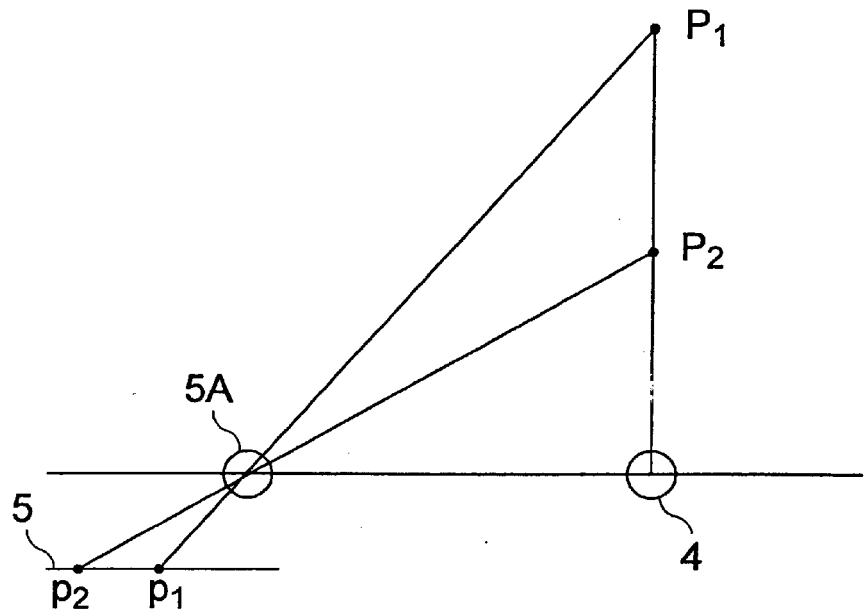
FIGS. 2A and 2B are explanatory views of range-finding by a light-projecting device and a PSD.
Figure 2B:
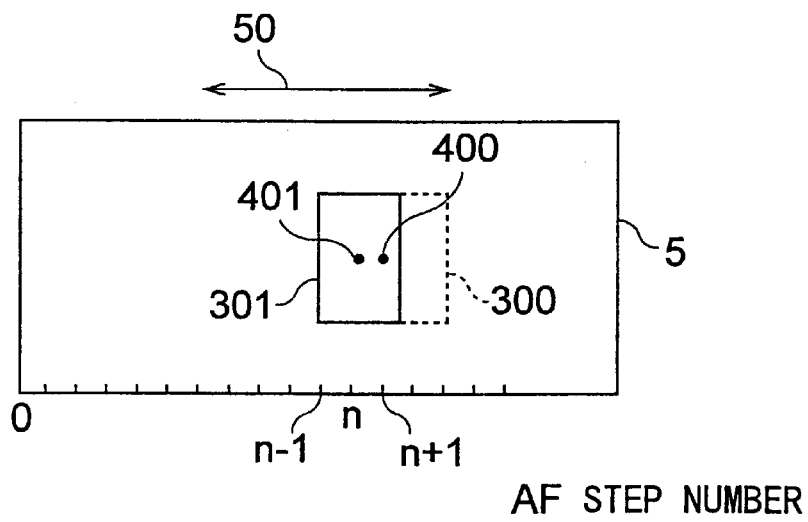

First, a camera in which the rangefinder apparatus in accordance with an embodiment of the present invention is suitably employed will be explained. The arrangement of the front face of this camera is similar to that shown in FIG. 1. As depicted, in the front face portion of the camera body, a finder 9 and a lens mount 8A holding a taking lens 8 are arranged, whereas an IRED (infrared light-emitting diode) 4, as a light-projecting device, and a PSD (position sensitive detector) 5 are disposed on the upper side of the lens mount 8A in alignment with the sidewise direction, i.e., base-length direction 50. The rangefinder apparatus in accordance with this embodiment includes the IRED 4 and PSD 5.

The configuration of the rangefinder apparatus in accordance with this embodiment will now be explained. FIG. 3 is a configurational view of the rangefinder apparatus in accordance with this embodiment.

A CPU 1 is used for controlling the whole camera equipped with this rangefinder apparatus, and controls the whole camera according to a program and parameters pre-stored in an EEPROM (Electrically Erasable and Programmable Read-Only Memory) 2. In the rangefinder apparatus shown in this drawing, the CPU 1 regulates a driver 3, so as to control the emission of infrared light from the IRED 4. Also, the CPU 1 controls actions of an autofocus IC (AFIC) 10, and inputs AF signals outputted from the AFIC 10.

The IRED 4 successively projects to an object to be measured three infrared light beams having an identical emission center-of-gravity position with respect to the base-length direction and emission light intensity distributions different from each other. Here, the base-length direction is the direction of the line connecting the IRED 4 and the PSD 5. The IRED 4 will be explained later in detail.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of the PSD 5, at a position on the light-receiving surface of the PSD 5. This light-receiving position corresponds to the distance to the object. Then, the PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5, whereas the output ratio ($I_1/(I_1+I_2)$) represents the light-receiving position on the light-receiving surface of the PSD 5, i.e., the distance to the object. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, a clamping circuit 13, an arithmetic circuit 14, and an integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$; whereas the second signal processing circuit 12 inputs therein a signal $I_2+I_0$ outputted from the PSD 5, and eliminates the steady-state light component $I_0$ therefrom, thereby outputting the far-side signal $I_2$.

The clamping circuit 13 inputs therein the far-side signal $I_2$ outputted from the second signal processing circuit 12, compares a clamp signal $I_c$ having a certain constant level and the far-side signal $I_2$ in terms of the magnitude of their levels. If the former is greater than the latter, then the clamp signal $I_c$ is outputted; otherwise, the far-side signal $I_2$ is outputted as it is. In the following, the signal outputted from the clamping circuit 13 is represented by $I_{2c}$.

The arithmetic circuit 14 inputs therein the near-side signal $I_1$ outputted from the first signal processing circuit 11 and the signal $I_{2c}$ (the signal having a greater value in the far-side signal $I_2$ and the clamp signal $I_c$) outputted from the clamping circuit 13, calculates an output ratio ($I_1/(I_1+I_{2c})$), and outputs an output ratio signal representing the result thereof. The integrating circuit 15 inputs therein the output ratio signal and, together with an integrating capacitor 6 connected to the $C_{INT}$ terminal of the AFIC 10, accumulates the output ratio a plurality of times, thereby improving the S/N ratio. Thus accumulated output ratio is outputted from the $S_{OUT}$ terminal of the AFIC 10 as an AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes the taking lens 8 to effect a focusing action.

Figure 4:
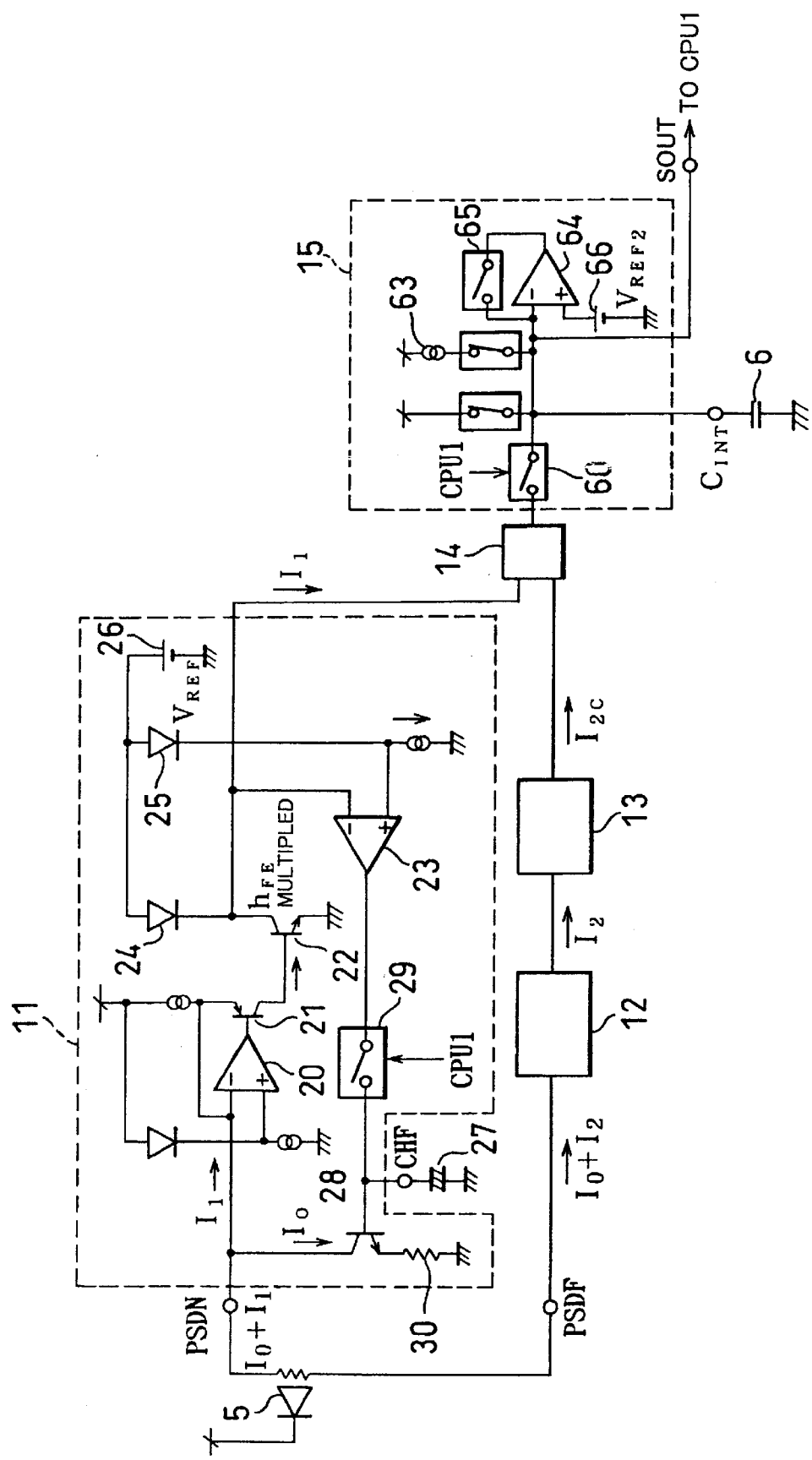
FIG. 4 is a circuit diagram of the first signal processing circuit and integrating circuit in the rangefinder apparatus in accordance with the above-mentioned embodiment.
Figure 5:
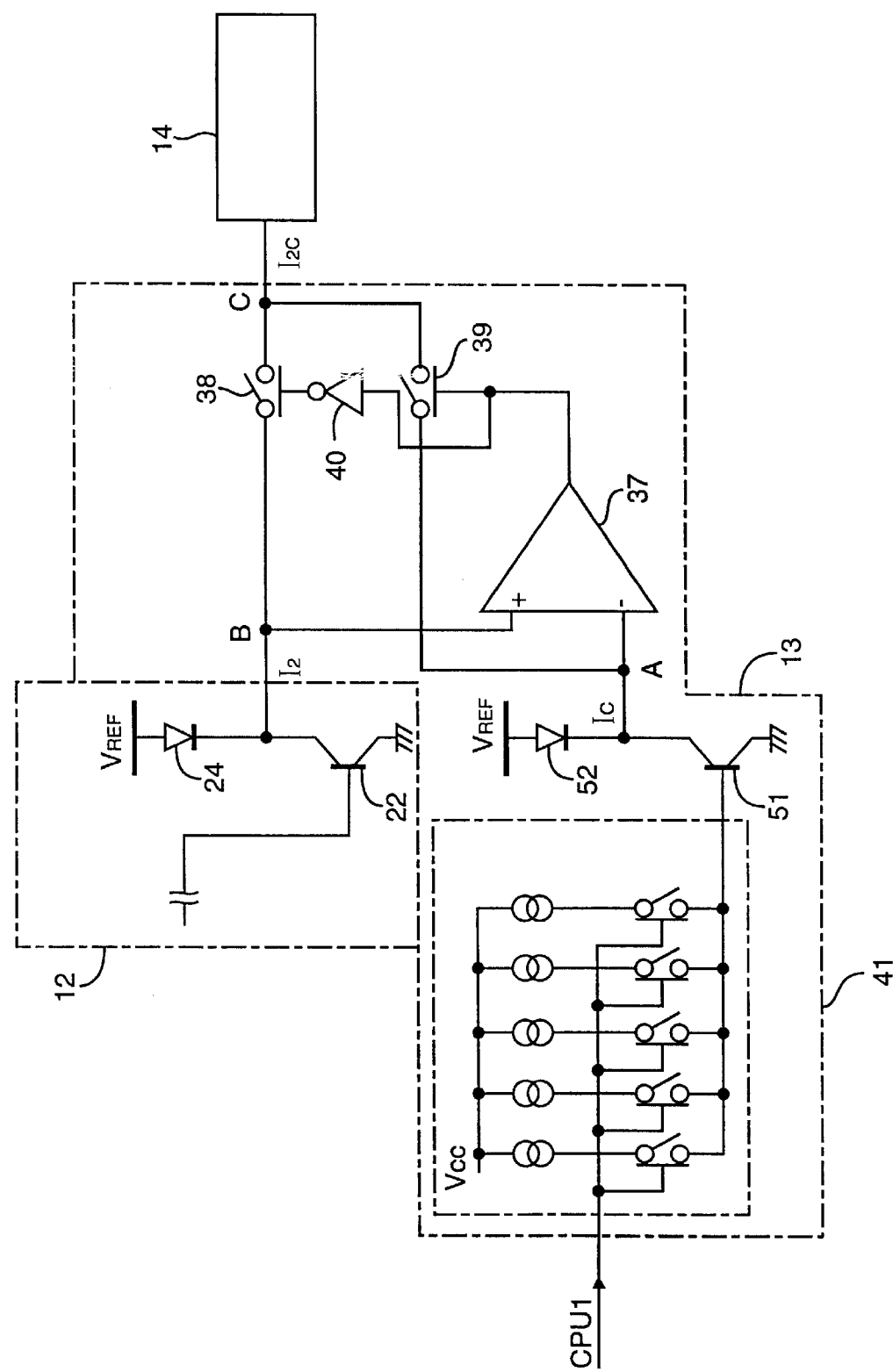
FIG. 5 is a circuit diagram of the clamping circuit in the rangefinder apparatus in accordance with the above-mentioned embodiment.

More specific respective circuit configurations of the first signal processing circuit 11, clamping circuit 13, and integrating circuit 15 in the AFIC 10 will now be explained. FIG. 4 is a circuit diagram of the first signal processing circuit 11 and integrating circuit 15 in the rangefinder apparatus in accordance with this embodiment. FIG. 5 is a circuit diagram of the clamping circuit 13 in the rangefinder apparatus in accordance with this embodiment. Here, the second signal processing circuit 12 has a circuit configuration similar to that of the first signal processing circuit 11.

The first signal processing circuit 11, whose circuit diagram is shown in FIG. 4, inputs therein the near-side signal $I_1$ with the steady-state light component $I_0$ outputted from the PSD 5, eliminates the steady-state light component $I_0$, and outputs the near-side signal $I_1$. The current $(I_1+I_0)$ outputted from the near-distance-side terminal of the PSD 5 is fed to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The circuit diagram of the clamping circuit 13 is shown in FIG. 5. The "+" input terminal of a determination comparator 37 in the clamping circuit 13 is connected to the collector terminal of the transistor 22 in the second signal processing circuit 12, and to the input terminal of the arithmetic circuit 14 by way of a switch 38. On the other hand, the "−" input terminal of the determination comparator 37 is connected to the collector terminal of a transistor 51 and the cathode terminal of a compression diode 52, as with the transistor 22 and compression diode 24 connected to the "+" input terminal thereof, and is also connected to the input terminal of the arithmetic circuit 14 by way of a switch 39.

Also, a clamp current source 41 is connected to the base terminal of the transistor 51. In this clamp current source 41, a plurality of sets of constant current sources and switches, each comprising a constant current source and a switch connected in series, are connected in parallel, and each switch is adapted to open and close under the control of the CPU 1. The clamp current source 41 inputs a clamp current, which is the sum of the currents from the respective constant current sources corresponding to the closed switches, to the base terminal of the transistor 51. This clamp current becomes the base current of the transistor 51, and the collector potential corresponding to the magnitude thereof is fed to the "−" input terminal of the determination comparator 37.

The output terminal of the determination comparator 37 is connected to the switch 39, whereby the output signal of the former is inputted to the latter. Also, the output terminal of the determination comparator 37 is connected to the switch 38 by way of an inverter 40, whereby the output signal of the determination comparator 37 is inputted to the switch 38 after being inverted. Hence, the switches 38 and 39 have such a relationship therebetween that, if one of them is turned ON by the output signal from the determination comparator 37, the other is turned OFF.

The circuit configuration of the integrating circuit 15 is shown in FIG. 4. The integrating capacitor 6 externally attached to the $C_{INT}$ terminal of the AFIC 10 is connected to the output terminal of the arithmetic circuit 14 by way of a switch 60, to a constant current source 63 by way of a switch 62, to the output terminal of an operational amplifier 64 by way of a switch 65, and directly to the "−" input terminal of the operational amplifier 64, whereas the potential thereof is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

The outline of operations of thus configured AFIC 10 will now be explained with reference to FIGS. 4 and 5. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the capacitor 27.

When the CPU 1 turns OFF the switch 29 while causing the IRED 4 to emit light, of the signal $I_1+I_0$ outputted from the PSD 5 at this time, the steady-state light component $I_0$ flows as the collector current into the transistor 28 to which the base potential is applied by the charge stored in the capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the clamping circuit 13.

The far-side signal $I_2$ inputted to the clamping circuit 13 is fed to the "+" input terminal of the determination comparator 37 in the clamping circuit 13. The clamp current outputted from the clamp current source 41 flows as a base current into the transistor 51, and its accompanying potential (clamp signal $I_c$) at the collector terminal of the transistor 51 is inputted to the "−" input terminal of the determination comparator 37. The far-side signal $I_2$ and the clamp signal $I_c$ are compared with each other in terms of magnitude by the determination comparator 37. According to the result thereof, one of the switches 38 and 39 is turned ON, whereas the other is turned OFF. Namely, if the far-side signal $I_2$ is greater than the clamp signal $I_c$, then the switch 38 is turned ON, whereas the switch 39 is turned OFF, whereby the far-side signal $I_2$ is outputted as the output signal $I_{2c}$ of the clamping circuit 13. If their relationship in terms of magnitude is reversed, then the switch 38 is turned OFF, whereas the switch 39 is turned ON, whereby the clamp signal $I_c$ is outputted as the output signal $I_{2c}$ of the clamping circuit 13.

The signal $I_{2c}$ outputted from the clamping circuit 13 and the near-side signal $I_1$ outputted from the first signal processing circuit 11 are inputted to the arithmetic circuit 14, and the output ratio $(I_1/(I_1+I_{2c}))$ is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 61, 62, and 65 are turned OFF, whereby the output ratio signal outputted from the arithmetic circuit 14 is stored in the integrating capacitor 6. When a predetermined number of pulse light emissions are completed, then the switch 60 is turned OFF, whereas the switch 62 is turned ON, whereby the charge stored in the integrating capacitor 6 is reduced by the charge having an opposite potential supplied from the constant current source 63. The CPU 1 monitors the potential of the integrating capacitor 6, so as to measure the time required for regaining the original potential, and determines the AF signal according to thus measured time, thereby determining the distance to the object. How to determine the distance to the object will be explained later in detail.

Figure 6:
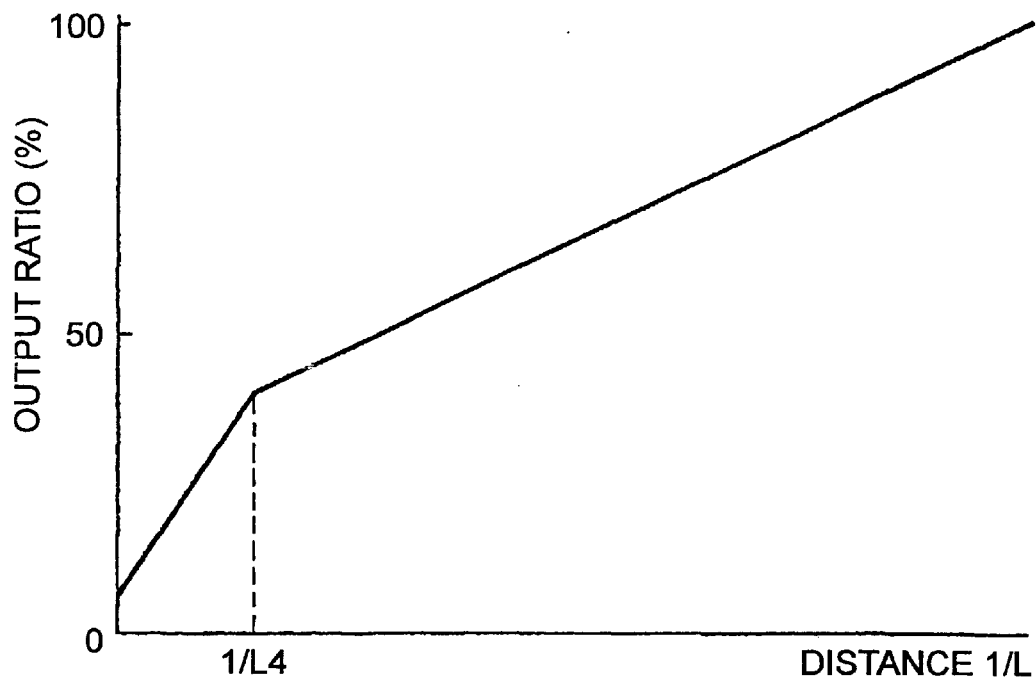
FIG. 6 is a graph showing the relationship between the AF signal outputted from the integrating circuit in the rangefinder apparatus in accordance with the above-mentioned embodiment and the distance to the object to be measured.

FIG. 6 shows the relationship between thus obtained AF signal and the distance L to the object to be measured. Namely, FIG. 6 is a graph showing the relationship between the AF signal outputted from the integrating circuit of the rangefinder apparatus in accordance with this embodiment and the distance to the object to be measured. In this graph, the abscissa indicates the reciprocal (1/L) of the distance L to the object, whereas the ordinate indicates the output ratio $(I_1/(I_1+I_2))$, i.e., AF signal. As shown in this graph, when the distance L to the object is at a certain distance $L_4$ or less $(L \leq L_4)$, the signal outputted from the clamping circuit 13 is $I_2$, the output ratio is $I_1/(I_1+I_2)$, and the output ratio has substantially a linear relationship with respect to the reciprocal (1/L) of the distance L, such that the output ratio decreases as the distance L is longer (1/L is smaller). At the distance $L_4$ or greater $(L \geq L_4)$, on the other hand, the signal outputted from the clamping circuit 13 is $I_c$, the output ratio is $I_1/(I_1+I_c)$, and the output ratio decreases as the distance L is longer in this case as well. Thus, when the clamping circuit 13 is used, the distance L to the object can be determined uniquely and reliably from the output ratio (AF signal).

Figure 7:
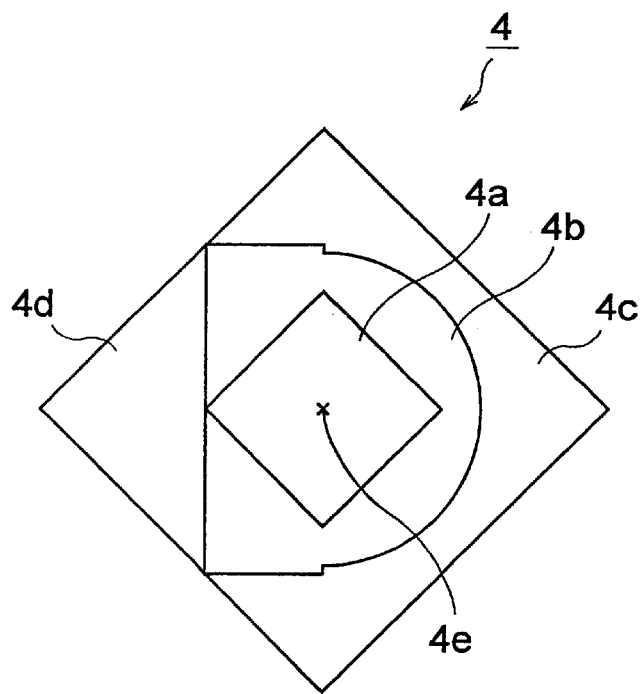
FIG. 7 is a view for explaining an example of IRED in the rangefinder apparatus in accordance with the above-mentioned embodiment.

The IRED 4 will now be explained in detail. FIG. 7 is a view for explaining an example of the IRED 4 in the rangefinder apparatus in accordance with this embodiment. This drawing shows the light-emitting face of the IRED 4 as viewed from the object side. As depicted, the light-emitting face of the IRED 4 is divided into four light-emitting areas 4a, 4b, 4c, and 4d. The IRED 4 is driven by the driver 3, such that only the light-emitting area 4a emits light to project a first correction beam, only two light-emitting areas 4a and 4b emit light to project a reference beam, and all the four light-emitting areas 4a to 4d emit light to project a second correction beam. Both of the first and second correction beams have a square cross section having one diagonal parallel to the base-length direction, while their beam sizes are different from each other. The reference beam has a cross-sectional form which is composed of a rectangle and a semicircle. Namely, the reference beam, the first correction beam, and the second correction beam have emission light intensity distributions different from each other. Also, the reference beam, the first correction beam, and the second correction beam have their emission center-of-gravity positions at an identical position 4e with respect to the base-length direction. Further, the emission light intensity distribution concerning the base-length direction of one of the reference beam, first correction beam, and second correction beam (the reference beam in this drawing) is asymmetrical about the emission center-of-gravity position 4e.

Figure 8A:
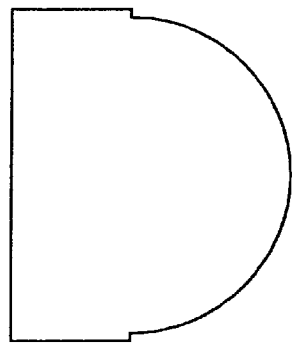
FIGS. 8A and 8B are explanatory views of a reference beam projected to the object to be measured.
Figure 8B:
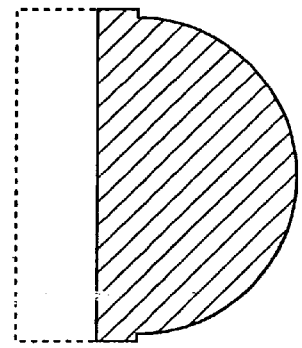

FIGS. 8A and 8B are explanatory views of the reference beam projected to the object to be measured. FIG. 8A is a view showing the case where the whole reference beam is projected to the object, whereas FIG. 8B is a view showing the case where the reference beam is shifted leftward so that only a part thereof (the hatched area in the drawing) is projected to the object. If all of the reference beam outputted from the IRED 4 is projected to the object as shown in FIG. 8A, then a beam having a form similar to that of the reference beam reaches the light-receiving surface of the PSD 5. However, if the reference beam outputted from the IRED 4 is shifted leftward so that only a part thereof is projected to the object, then a beam having a form similar to the part of reference beam projected to the object reaches the light-receiving surface of the object. If a beam eclipse occurs as such, then the center-of-gravity position of the beam received by the PSD 5 changes in response to the extent of the beam eclipse. Since the reference beam has an asymmetrical form, the extent of change in the center-of-gravity position of the received light varies depending on whether the beam eclipse occurs on the right side or left side.

Figure 9A:
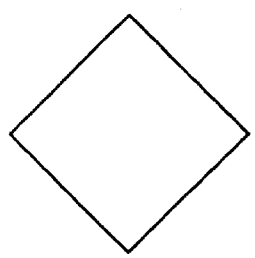
FIGS. 9A and 9B are explanatory views of a first reference beam projected to the object to be measured.
Figure 9B:
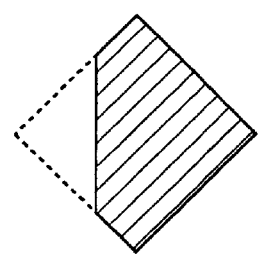

FIGS. 9A and 9B are explanatory views of the first correction beam projected to the object to be measured. FIG. 9A is a view showing the case where the whole first correction beam is projected to the object, whereas FIG. 9B is a view showing the case where the first correction beam is shifted leftward so that only a part thereof (the hatched area in the drawing) is projected to the object. If all of the first correction beam outputted from the IRED 4 is projected to the object as shown in FIG. 9A, then a beam having a form similar to that of the first correction beam reaches the light-receiving surface of the PSD 5. However, if the first correction beam outputted from the IRED 4 is shifted leftward so that only a part thereof is projected to the object, then a beam having a form similar to the part of first correction beam projected to the object reaches the light-receiving surface of the object. If a beam eclipse occurs as such, then the center-of-gravity position of the beam received by the PSD 5 changes in response to the extent of the beam eclipse. Since the first correction beam has a symmetrical form, the extent of change in the center-of-gravity position of the received light is independent of whether the beam eclipse occurs on the right side or left side. The same holds true for the second reference beam.

The amount of fluctuation of the beam center-of-gravity position with respect to the amount of beam eclipse will now be explained. In general, letting x and y be orthogonal coordinates, ρ(x, y) be the emission light intensity distribution, and the base-length direction be x axis, the beam center-of-axis position X with respect to the base-length direction is represented by the following expression:

$$X = \frac{\iint \rho \cdot x \cdot dx \cdot dy}{\iint \rho \cdot dx \cdot dy} \quad (1)$$

In the following, the emission light intensity distribution ρ is assumed to be constant regardless of its position (x, y).

Figure 10:
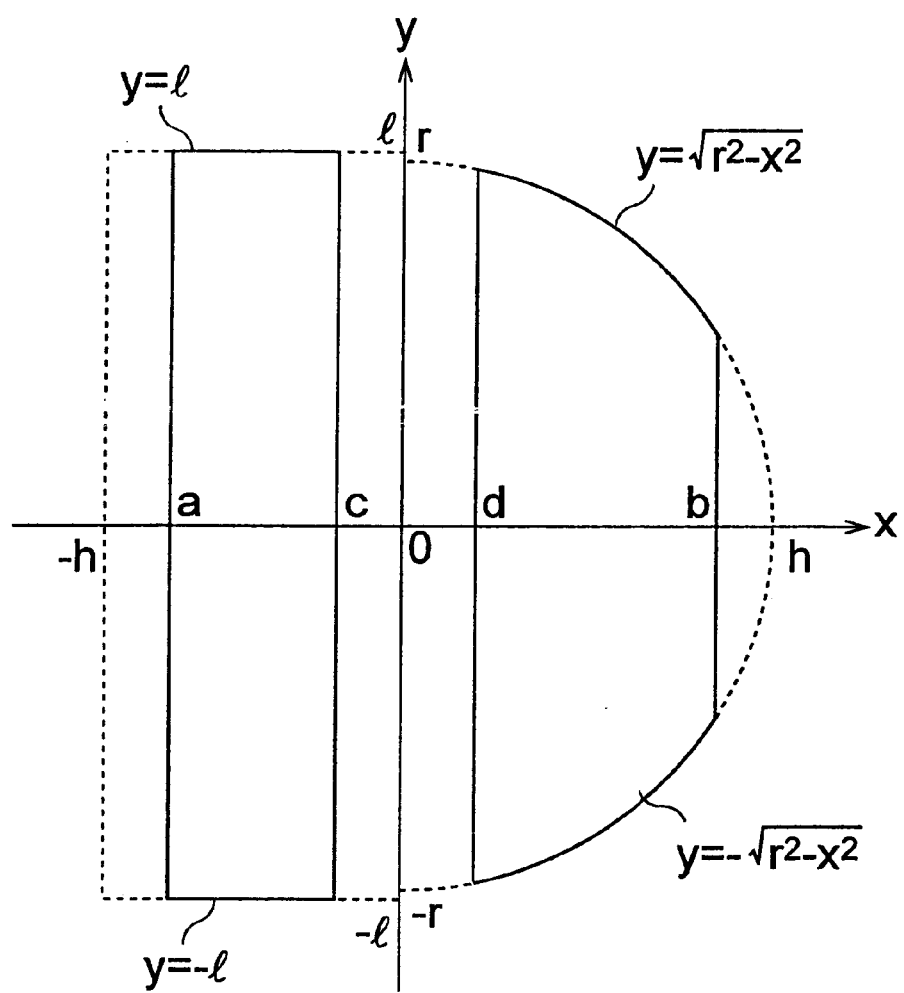
FIG. 10 is an explanatory view of a beam eclipse in the reference beam.

Suppose the case where a beam eclipse occurs in the reference beam as shown in FIG. 10. As depicted, the original reference beam is assumed to be composed of a rectangle (having a size of h×2l) in the region where x≦0, and a semicircle (having a radius r) in the region where x≧0. Letting individual parameters have relationships of −h<a<c<0<d<b<r in terms of magnitude, it is assumed that areas in which the beam eclipse is generated are those where −h<x<a, c<x<d, and b<x<r. At this time, the beam center-of-gravity position X with respect to the base-length direction is represented by the following expression:

$$X = \frac{lc^2 - la^2 + 2 \cdot \{-(r^2-b^2)^{3/2}/3 + (r^2-d^2)^{3/2}/3\}}{2lc - 2la + b(r^2-b^2)^{1/2} +} \quad (2)$$
$$r^2\sin^{-1}(b/r) - d(r^2-d^2)^{1/2} - r^2\sin^{-1}(d/r)$$

Figure 11:
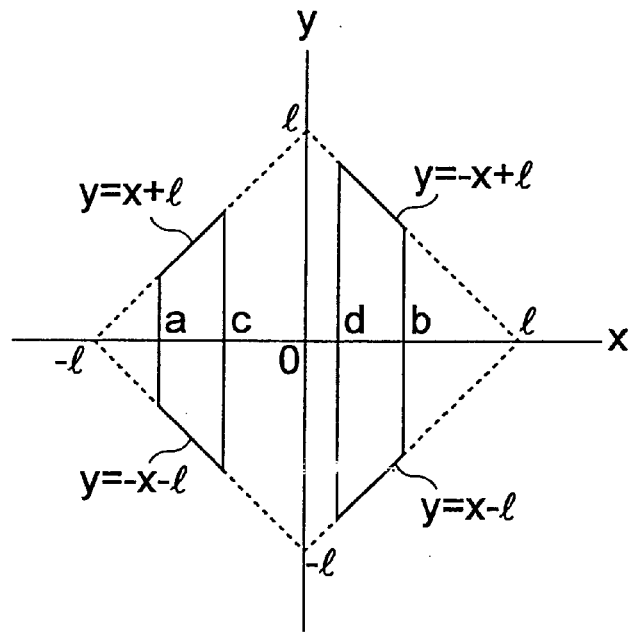
FIG. 11 is an explanatory view of a beam eclipse in the first correction beam.

On the other hand, suppose the case where a beam eclipse occurs in the first correction beam as shown in FIG. 11. As depicted, it is assumed that the original first correction beam is centered at the origin and has respective diagonals aligning with x and y axis, with each diagonal having a length of 2l. Letting individual parameters have relationships of −l<a<c<0<d<b<l in terms of magnitude, it is assumed that areas in which the beam eclipse is generated are those where −l<x<a, c<x<d, and b<x<l. At this time, the beam center-of-gravity position X with respect to the base-length direction is represented by the following expression:

$$X = \frac{(2c^3/3 + lc^2) - (2a^3/3 + la^2) + (-2b^3/3 + lb^2) -}{(c^2+2lc) - (a^2+2la) + (-b^2+2lb) - (-d^2+2ld)} \quad (3)$$
$$\frac{(-2d^3/3 + ld^2)}{}$$

The same holds true for the second correction beam.

Figure 12:
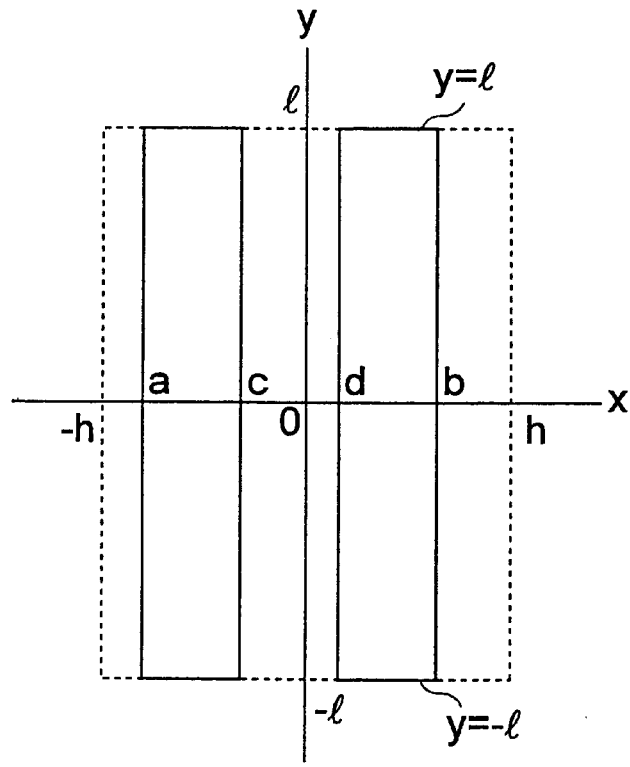
FIG. 12 is an explanatory view of a beam eclipse in a square beam.

Further, suppose the case where a beam eclipse occurs in a rectangular beam as shown in FIG. 12. As depicted, it is assumed that the original rectangular beam is centered at the origin and has respective sides parallel to x and y axis with lengths 2h and 2l. Letting individual parameters have relationships of −h<a<c<0<d<b<h in terms of magnitude, it is assumed that areas in which the beam eclipse is generated are those where −h<x<a, c<x<d, and b<x<h. At this time, the beam center-of-gravity position X with respect to the base-length direction is represented by the following expression:

$$X = \frac{lc^2 - la^2 + lb^2 - ld^2}{2lc - 2la + 2lb - 2ld} \quad (4)$$

Figure 13:
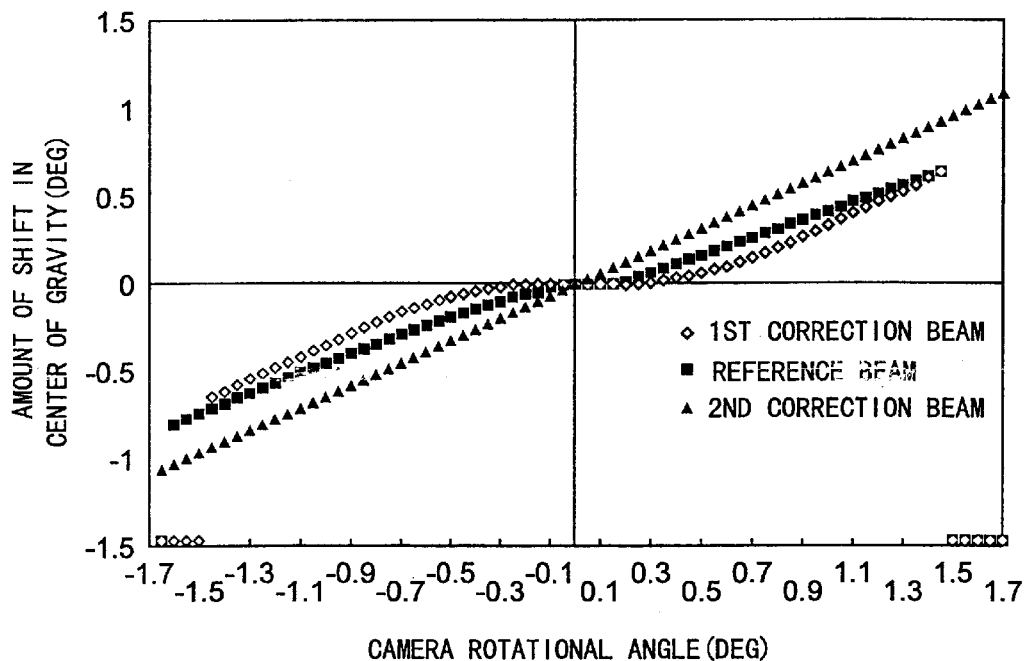
FIG. 13 is a graph showing changes in center-of-gravity position X with respect to the rotational angle of a camera mounted with the rangefinder apparatus in accordance with the above-mentioned embodiment.
Figure 14:
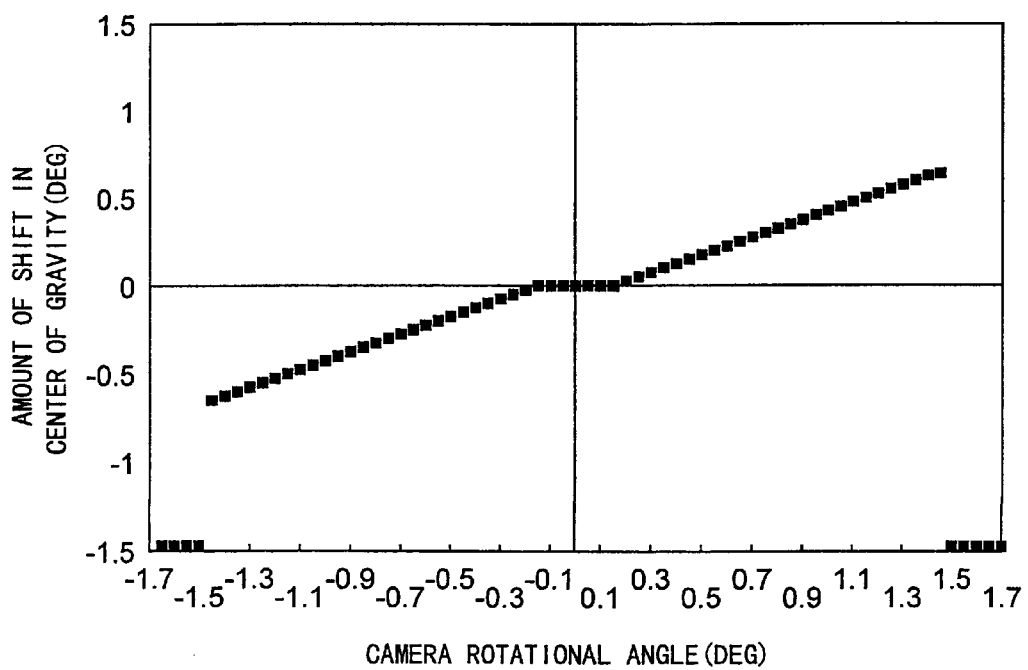
FIG. 14 is a graph showing changes in center-of-gravity position X with respect to the rotational angle of the camera mounted with the rangefinder apparatus in accordance with the above-mentioned embodiment.

FIGS. 13 and 14 are graphs showing changes in center-of-gravity position X with respect to the rotational angle of the camera mounted with the rangefinder apparatus in accordance with this embodiment for each of the above-mentioned expressions (2) to (4). FIG. 13 shows the changes concerning each of the reference beam, first correction beam, and second correction beam. FIG. 14 shows the changes concerning the rectangular beam. Here, the width of the object to be measured as seen from the rangefinder apparatus is assumed to be ±0.816 degree. As can be seen from these graphs, since the reference beam is laterally asymmetrical and h<r, the angle (−1.7 degrees) of the leftward (minus) rotation of the camera at which the beam is completely eclipsed is greater than the angle (+1.5 degrees) of the rightward (plus) rotation of the camera at which the beam is completely eclipsed. On the other hand, each of the first correction beam, second correction beam, and rectangular beam is laterally symmetrical, whereby the angle of the leftward (minus) rotation of the camera at which the beam is completely eclipsed is identical to the angle of the rightward (plus) rotation of the camera at which the beam is completely eclipsed.

Figure 15:
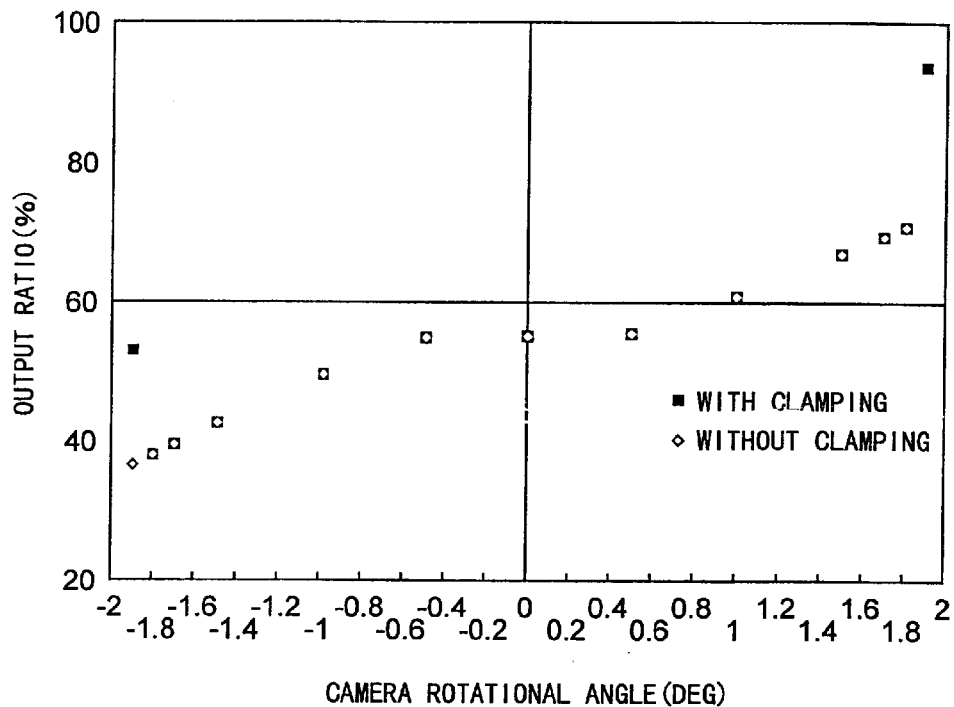
FIG. 15 is a graph showing changes in output ratio with respect to the rotational angle of the camera mounted with the rangefinder apparatus in accordance with the above-mentioned embodiment.
Figure 16:
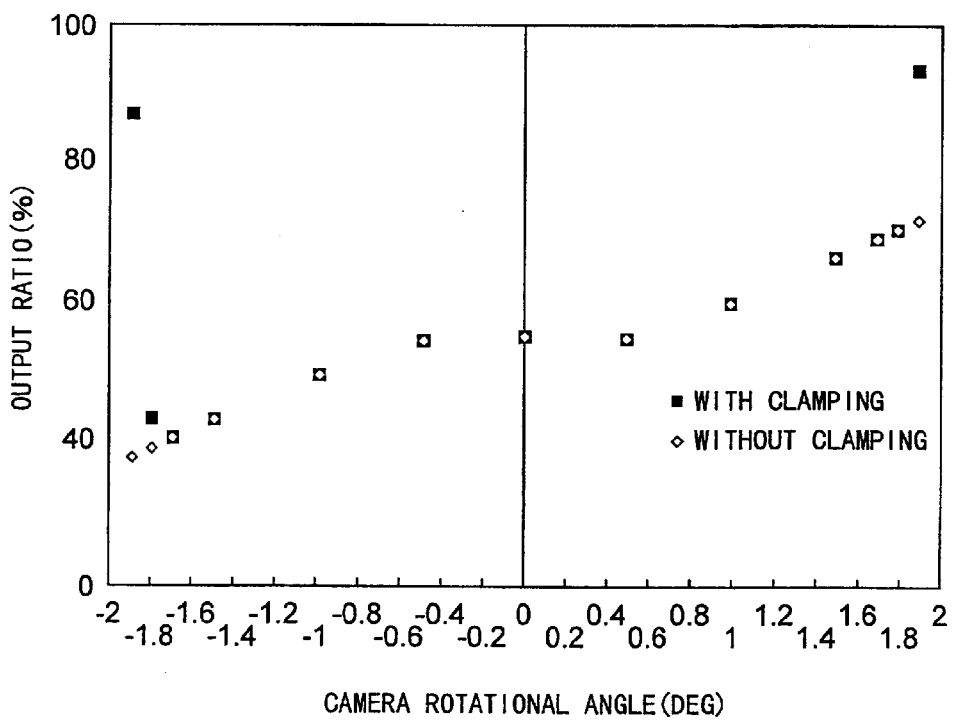
FIG. 16 is a graph showing changes in output ratio with respect to the rotational angle of the camera mounted with the rangefinder apparatus accordance with the above-mentioned embodiment.

Influences of the beam eclipse upon the output ratio will now be explained. FIGS. 15 and 16 show changes in output ratio with respect to the rotational angle of the camera.

FIG. 15 shows the changes concerning the reference beam, whereas FIG. 16 shows the changes concerning the rectangular beam. As can be seen from these graphs, the right side of the beam is eclipsed as the camera rotates rightward (in the plus direction), whereby the beam center-of-gravity position on the light-receiving surface of the PSD 5 shifts in the direction increasing the output ratio, i.e., to the far side. On the other hand, the left side of the beam is eclipsed as the camera rotates leftward (in the minus direction), whereby the beam center-of-gravity position on the light-receiving surface of the PSD 5 shifts in the direction decreasing the output ratio, i.e., to the near side. Also, as the quantity of received light decreases due to the beam eclipse, a clamping action is effected at 1.9 degrees on each of the right and left sides in the case of the laterally asymmetrical reference beam, whereas clamping actions are effected at 1.9 degrees on the right side and 1.8 degrees on the left side in the laterally symmetrical rectangular beam.

Figure 17:
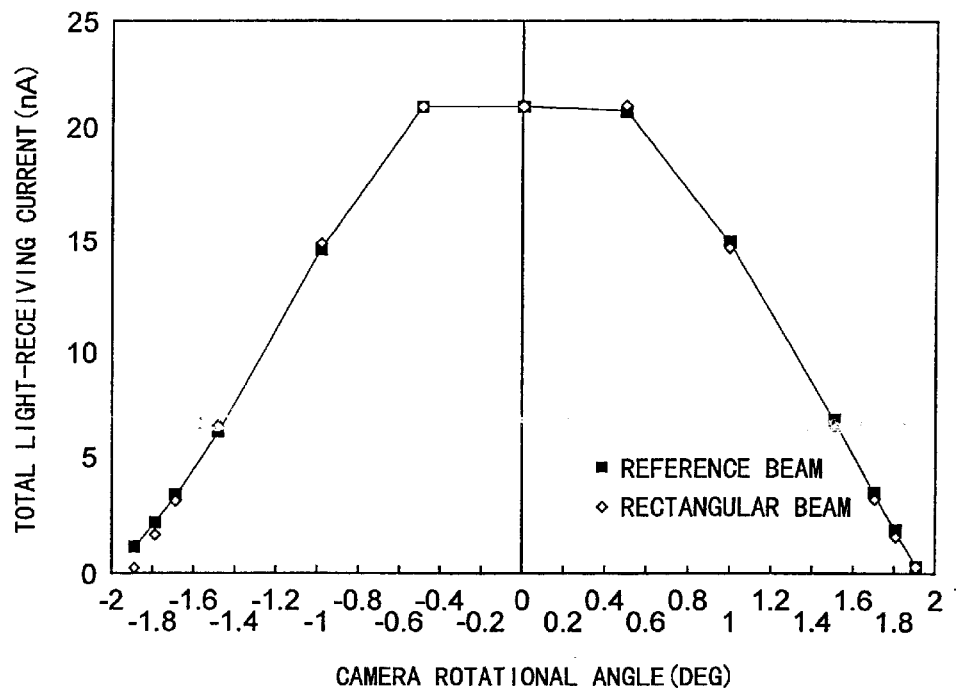
FIG. 17 is a graph showing changes in total amount of light-receiving current with respect to the rotational angle of the camera mounted with the rangefinder apparatus in accordance with the above-mentioned embodiment.

FIG. 17 is a graph showing changes in total light-receiving current with respect to the rotational angle of the camera. The total light-receiving current is the sum of the two kinds of current $I_1$ and $I_2$ outputted from the PSD 5. As can be seen from this graph, the changes in total light-receiving current caused by lateral beam eclipses are symmetrical in the case of the laterally symmetrical rectangular beam (indicated by whitened rhombuses in the graph). By contrast, the total light-receiving current in the laterally asymmetrical reference beam (indicated by black squares in the graph) becomes greater than that in the case of the rectangular beam when the camera is rotated leftward (in the minus direction).

Figure 18:
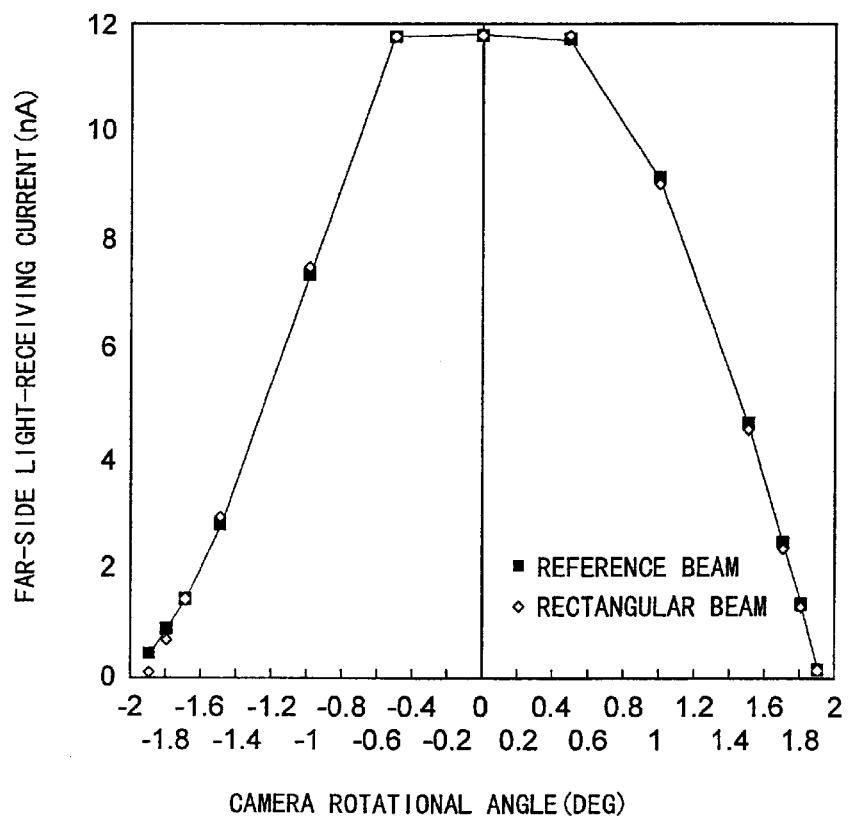
FIG. 18 is a graph showing changes in total amount of far-side light-receiving current with respect to the rotational angle of the camera mounted with the rangefinder apparatus in accordance with the above-mentioned embodiment.

FIG. 18 is a graph showing changes in far-side light-receiving current $I_2$ with respect to the rotational angle of the camera. As can be seen from this graph, the changes in far-side light-receiving current caused by lateral beam eclipses are asymmetrical in each of the cases of the laterally symmetrical rectangular beam (indicated by whitened rhombuses in the graph) and the laterally asymmetrical reference beam (indicated by black squares in the graph). Also, the far-side light-receiving current $I_2$ varies more greatly between the case of the laterally symmetrical rectangular beam (indicated by the whitened rhombuses in the graph) and the case of the laterally asymmetrical reference beam (indicated by the black squares in the graph) when the camera is rotated leftward (in the minus direction). For example, when the rotational angle of the camera is −1.8 degrees, the far-side light-receiving current of the laterally symmetrical rectangular beam (indicated by its corresponding whitened rhombus in the graph) is 0.73 nA, whereas that of the laterally asymmetrical reference beam (indicated by its corresponding black square in the graph) is 0.89 nA.

Figure 19:
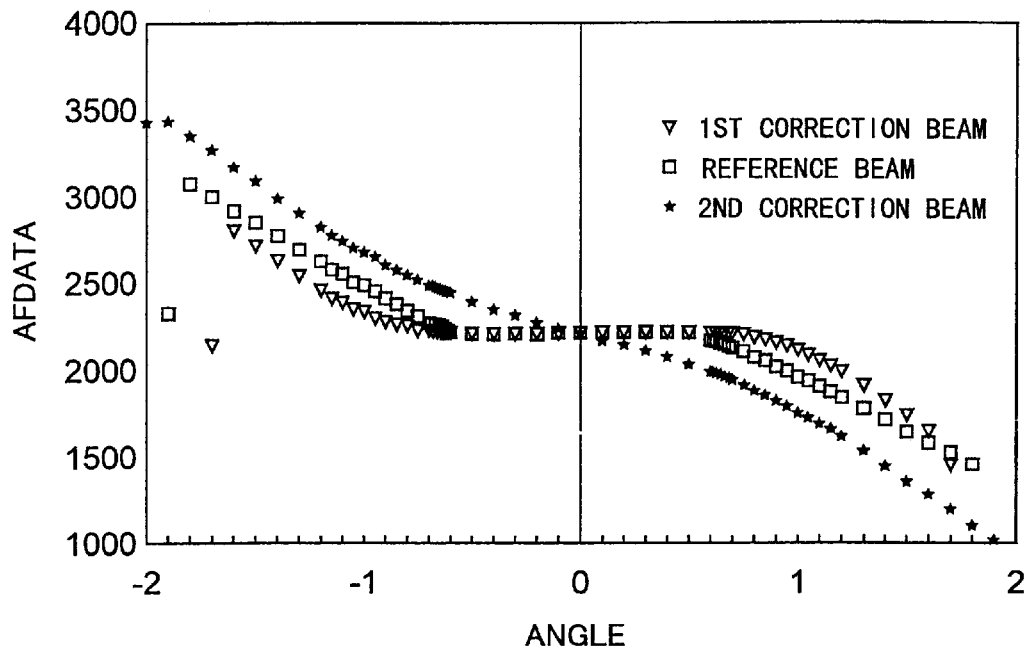
FIG. 19 is a graph showing changes in AF signal with respect to the rotational angle of the camera mounted with the rangefinder apparatus in accordance with the above-mentioned embodiment.
Figure 20:
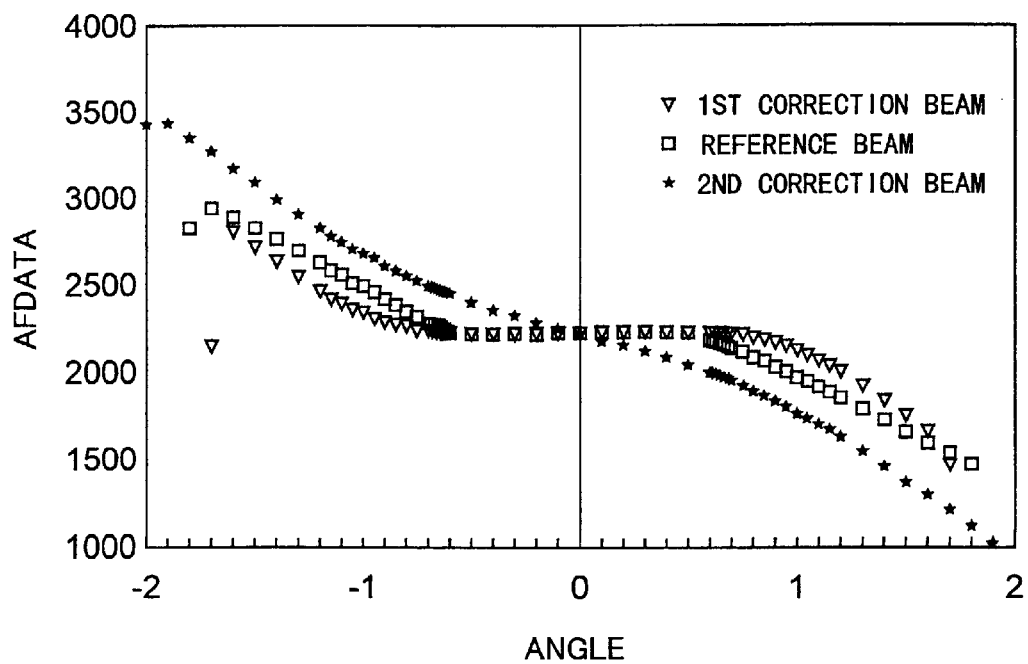
FIG. 20 is a graph showing changes in AF signal with respect to the rotational angle of the camera mounted with the rangefinder apparatus in accordance with the above-mentioned embodiment.

FIGS. 19 and 20 are graphs showing changes in AF signal with respect to the rotational angle of the camera. FIG. 19 shows the AF signal in the case of the reference beam (having a rectangular portion of 0.148 mm×0.388 mm, and a semicircular portion with a diameter 2r=0.371 mm) by whitened squares, the AF signal in the case of the first correction beam (having a diagonal length 2l=0.296 mm) by whitened inverted triangles, and the AF signal in the case of the second correction beam (having a diagonal length 2l=0.684 mm) by stars. FIG. 20 shows the AF signal in the case of the rectangular beam (0.296 mm×0.388 mm) by whitened squares, the AF signal in the case of the first correction beam (having a diagonal length 2l=0.296 mm) by whitened inverted triangles, and the AF signal in the case of the second correction beam (having a diagonal length 2=0.684 mm) by stars.

As can be seen from FIG. 20, in the case of the laterally symmetrical rectangular beam, the AF signal gradually increases as the camera rotates leftward until its rotational angle reaches −1.7 degrees, and starts to decrease when the rotational angle of the camera reaches −1.8 degrees. On the other hand, as can be seen from FIG. 19, in the case of the laterally asymmetrical reference beam, the AF signal gradually increases as the camera rotates leftward until its rotational angle reaches −1.8 degrees, and starts to decrease when the rotational angle of the camera reaches −1.9 degrees. Thus, correct range-finding cannot be carried out if the direction of change in AF signal is reversed, whereby it is preferred that the absolute value of the rotational angle of the camera at which the direction of change in AF signal is reversed be greater. From this viewpoint, the laterally asymmetrical reference beam is preferable.

The beam eclipse correction in the rangefinder apparatus in accordance with this embodiment will now be explained. In this beam eclipse correction, the reference beam, the first correction beam, and the second correction beam are individually projected from the IRED 4, their respective AF signals are determined, an amount of beam eclipse in the reference beam is detected according to these AF signals, and the beam eclipse is corrected in the AF signal in the case of the reference beam according to the amount of beameclipse, so as to determine the distance to the object to be measured. In the following, a method of determining a correction expression used for carrying out the beam eclipse correction, and the beam eclipse correction using this correction expression will be explained separately from each other.

Figure 21:
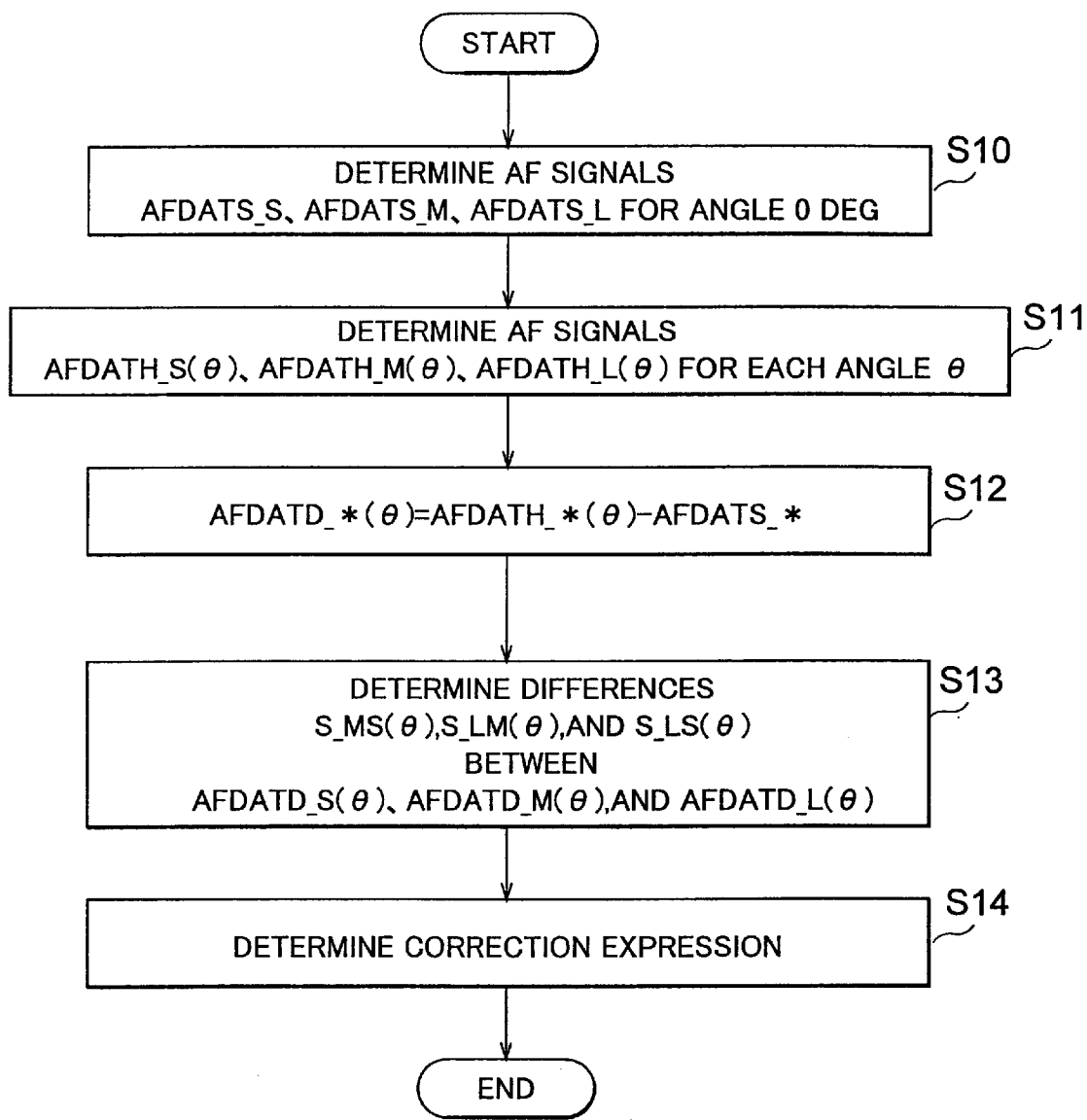
FIG. 21 is a flowchart for explaining how to determine a correction expression used when a beam eclipse correction is carried out in the rangefinder apparatus in accordance with the above-mentioned embodiment.

FIG. 21 is a flowchart for explaining how to determine the correction expression used for carrying out the beam eclipse correction in the rangefinder apparatus in accordance with this embodiment. In the following, it is assumed that the reference beam, the first correction beam, and the second correction beam such as those explained in conjunction with FIG. 7 are projected from the IRED 4. In the reference beam, it is supposed that the rectangular portion has a size of 0.148 mm×0.388 mm, and the diameter 2r of the semicircular portion is 0.371 mm. In the first correction beam, the diagonal length 2l is assumed to be 0.296 mm. In the second correction beam, the diagonal length 2l is assumed to be 0.684 mm.

At step S10, the rotational angle of the camera mounted with the rangefinder apparatus in accordance with this embodiment is set to 0 degree, the reference beam, the first correction beam, and the second correction beam are individually outputted from the IRED 4 so as to be projected to the center of the object to be measured, and their respective AF signals are determined. Namely, the respective AF signals obtained when the first correction beam, the reference beam, and the second correction beam are projected are taken as AFDATS_S, AFDATS_M, and AFDATS_L.

At step S11, the rotational angle of the camera mounted with the rangefinder apparatus in accordance with this embodiment is set to each angle θ (degrees), the reference beam, the first correction beam, and the second correction beam are individually outputted from the IRED 4 so as to be projected to the center of the object to be measured, and their respective AF signals are determined. Namely, with respect to each angle θ, the respective AF signals obtained when the first correction beam, the reference beam, and the second correction beam are projected are taken as AFDATH_S(θ), AFDATH_M(θ), and AFDATH_L(θ).

Figure 22:
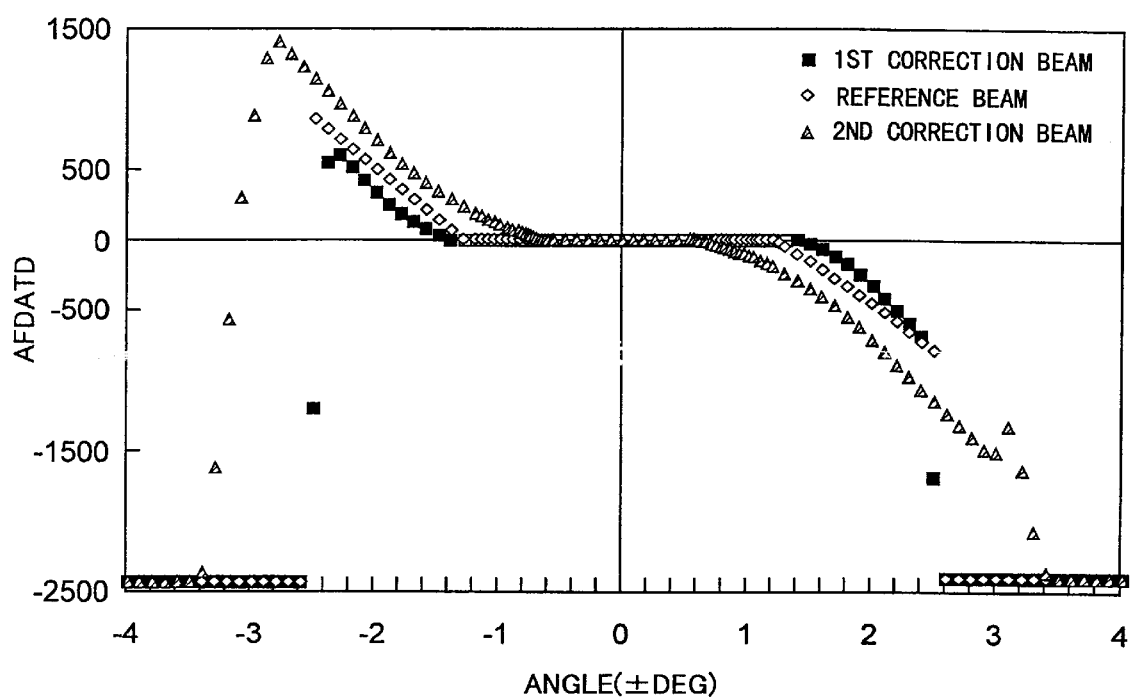
FIG. 22 is a graph showing amounts of fluctuations AFDATD_S($\theta$), AFDATD_M($\theta$), and AFDATD_L($\theta$) in AF signal with respect to the camera rotational angle ($\theta$)

At step S12, for each of the three beams, the AF signal determined at step S10 is subtracted from the AF signal with respect to each angle θ determined at step S11. Namely, arithmetic operations of:

$$AFDATD\_S(\theta)=AFDATH\_S(\theta)-AFDATS\_S \quad (5a)$$

$$AFDATD\_M(\theta)=AFDATH\_M(\theta)-AFDATS\_M \quad (5b)$$

$$AFDATD\_L(\theta)=AFDATH\_L(\theta)-AFDATS\_L \quad (5c)$$

are carried out, so as to determine the amount of fluctuation in AF signal with respect to the camera rotational angle of θ with reference to the camera rotational angle of 0 degree. The respective amounts of fluctuations in AF signal with respect to the camera rotational angle of θ in the cases where the first correction beam, the reference beam, and the second correction beam are projected are taken as AFDATD_S(θ), AFDATD_M(θ), and AFDATD_L(θ). FIG. 22 is a graph showing the amounts of fluctuations AFDATD_S(θ), AFDATD_M(θ), and AFDATD_L(θ) in AF signal with respect to the camera rotational angle θ determined at this step.

At step S13, differences between the amounts of fluctuations AFDATD_S(θ), AFDATD_M(θ), and AFDATD_L (θ) in AF signal with respect to the camera rotational angle θ determined at step S12 are determined for each angle θ. Namely, arithmetic operations of:

$$S\_MS(\theta)=AFDATD\_M(\theta)-AFDATD\_S(\theta) \quad (6a)$$

$$S\_LM(\theta)=AFDATD\_L(\theta)-AFDATD\_M(\theta) \quad (6b)$$

$$S\_LS(\theta)=AFDATD\_L(\theta)-AFDATD\_S(\theta) \quad (6c)$$

carried out, so as to determine differences S_MS(θ), S_LM (θ), and S_LS(θ).

Figure 23:
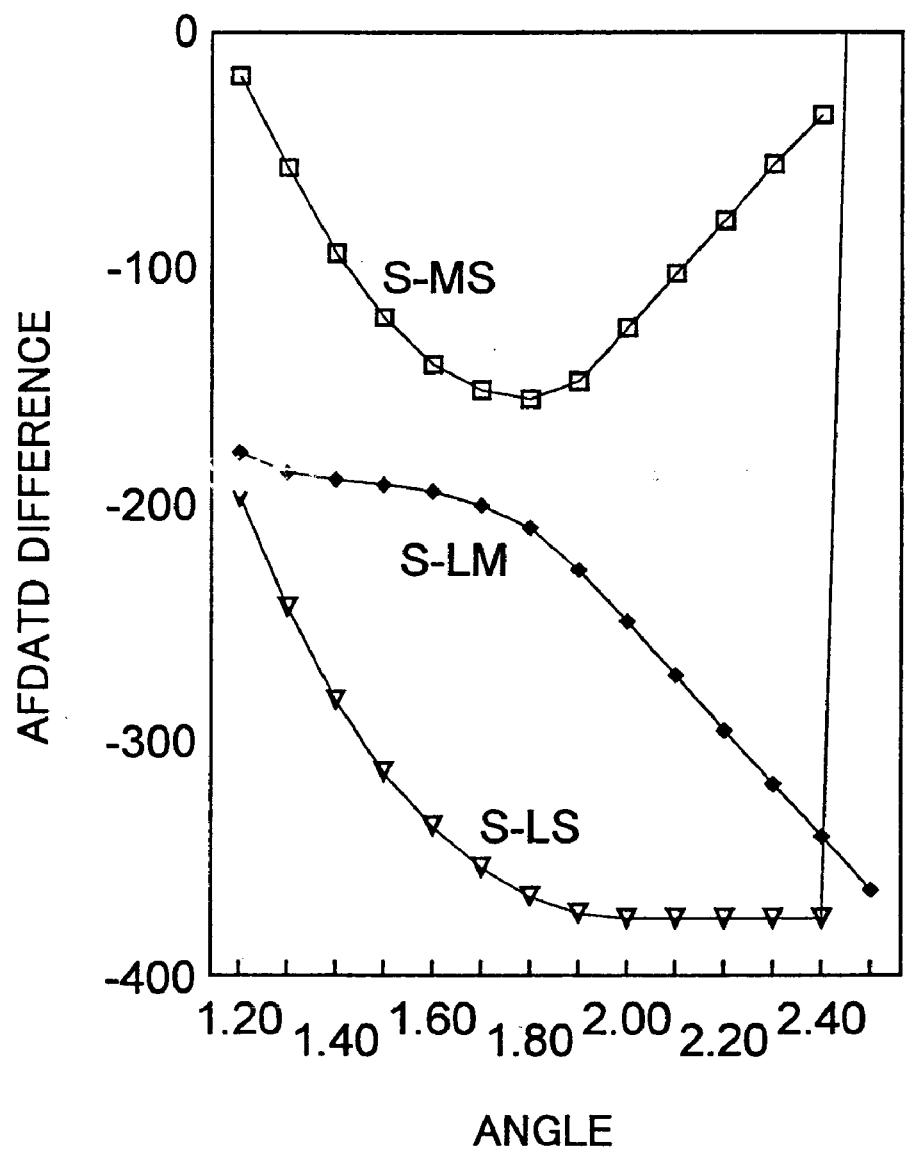
FIG. 23 is a graph showing differences S_MS($\theta$), S_LM($\theta$), and S_LS($\theta$) between the amounts of fluctuations AFDATD_S($\theta$), AFDATD_M($\theta$), and AFDATD_L($\theta$) in AF signal.
Figure 24:
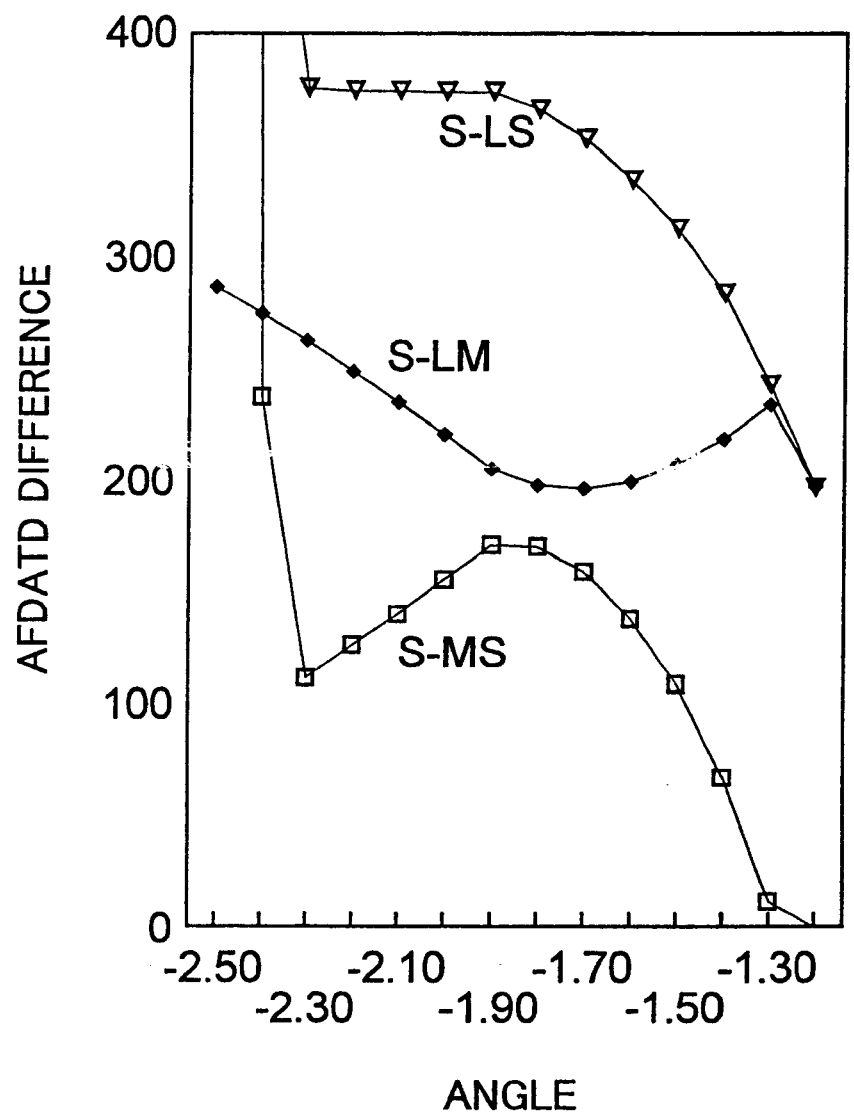
FIG. 24 is a graph showing differences S_MS($\theta$), S_LM($\theta$), and S_LS($\theta$) between the amounts of fluctuations AFDATD_S($\theta$), AFDATD_M($\theta$), and AFDATD_L($\theta$) in AF signal.

FIGS. 23 and 24 are graphs showing the differences S_MS(θ), S_LM(θ), and S_LS(θ) determined at step S13.

FIG. 23 shows the right side ($\theta>0$), whereas FIG. 24 shows the left side ($\theta<0$). As can be seen from these graphs, the right side ($\theta>0$) and left side ($\theta<0$) of each of the differences S_MS($\theta$), S_LM($\theta$), and S_LS($\theta$) are not symmetrical to each other. Also, on the right side ($\theta>0$), while the difference S_MS($\theta$) has an extreme value, the differences S_LS($\theta$) and S_LM($\theta$) have no extreme value. On the left side ($\theta<0$), while each of the differences S_MS($\theta$) and S_LM($\theta$) has an extreme value, the difference S_LS($\theta$) has no extreme value.

At step S14, a correction expression is determined according to the parameters obtained in the foregoing. The input variable X in the correction expression is one of the differences S_MS($\theta$), S_LM($\theta$), and S_LS($\theta$) determined at step S13. In view of the accuracy in correction, it is preferable that the fluctuation with respect to changes in angle $\theta$ be greater. The output variable Y in the correction expression is the amount of fluctuation AFDATD_M($\theta$) in AF signal in the case of the reference beam obtained at step S12. The correction expression may be of higher order. If the range of angle $\theta$ is divided such that the correction expression in each range is represented by a linear expression, then favorable corrections are possible, and the load of arithmetic operations effected by the CPU 1 is smaller. A correction expression is thus determined for each of the right- and left-side eclipses in each of a plurality of ranges of angle $\theta$.

Figure 25:
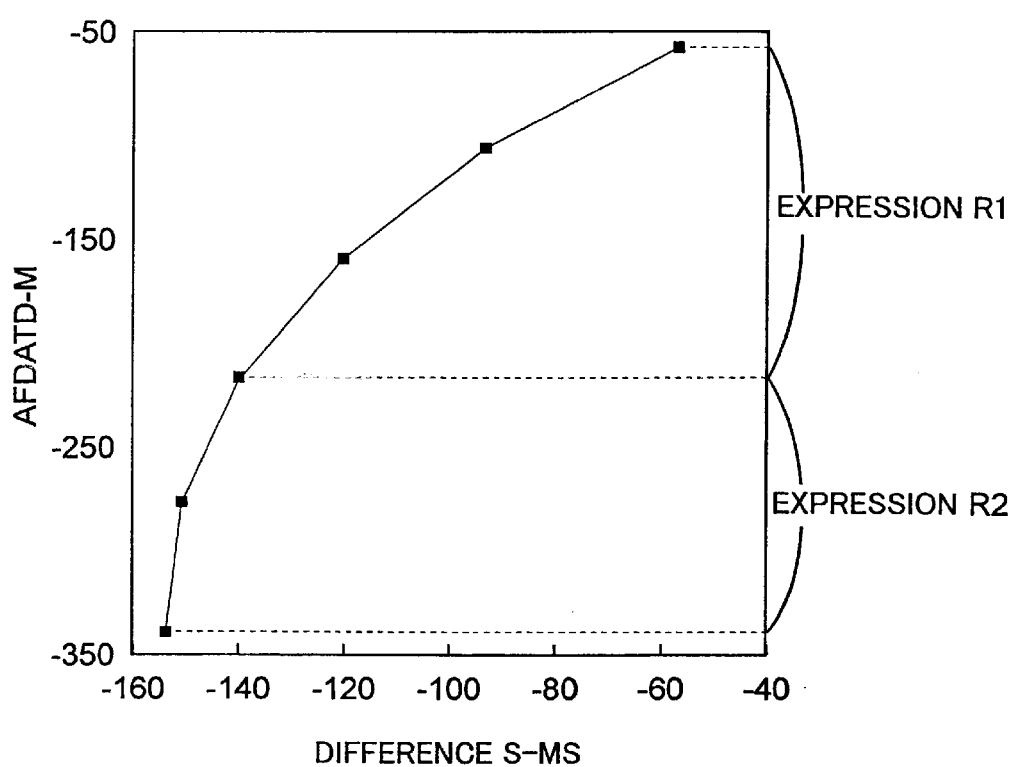
FIG. 25 is a graph showing the relationship between the amount of fluctuation AFDATD_M($\theta$) in AF signal and the difference S_MS($\theta$) within the range of $1.3° \leq \theta \leq 1.80°$.
Figure 26:
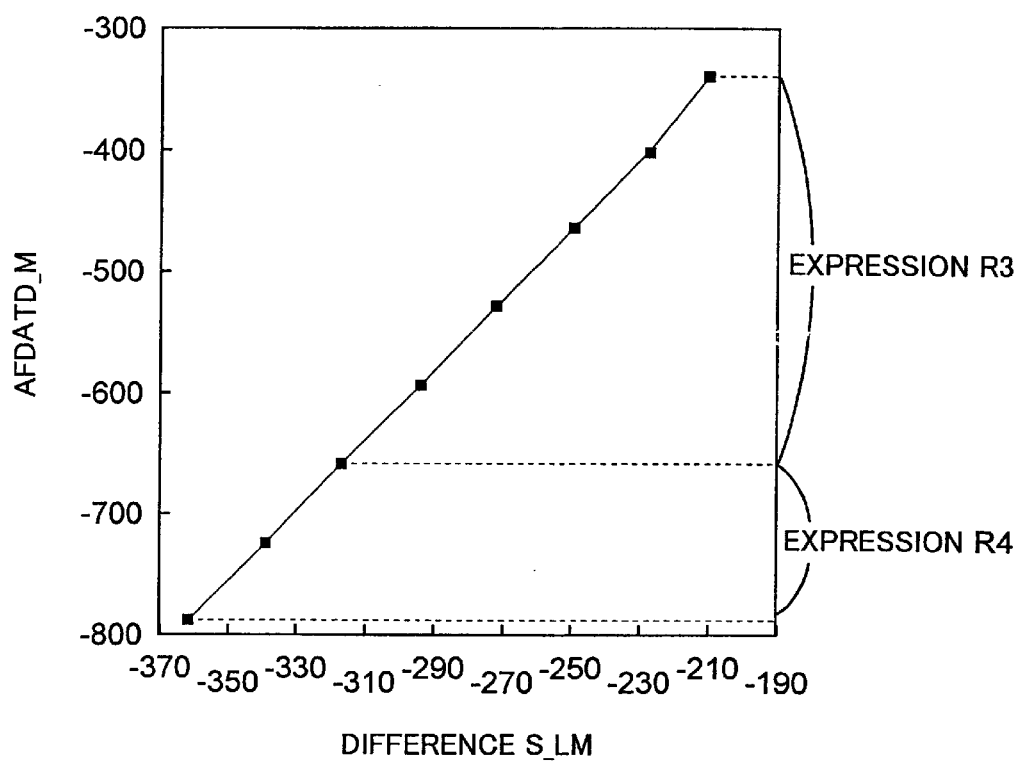
FIG. 26 is a graph showing the relationship between the amount of fluctuation AFDATD_M($\theta$) in AF signal and the difference S_LM($\theta$) within the range of $1.80° \leq \theta \leq 2.50°$.
Figure 27:
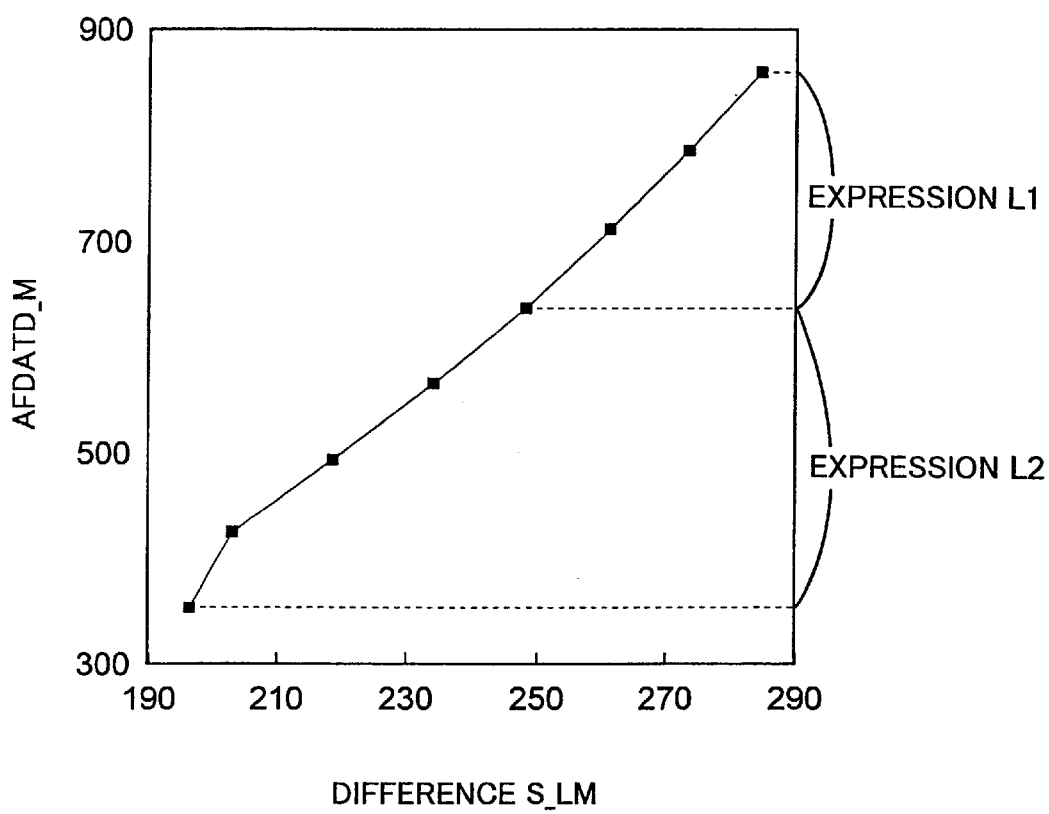
FIG. 27 is a graph showing the relationship between the amount of fluctuation AFDATD_M($\theta$) in AF signal and the difference S_LM($\theta$) within the range of $-2.50° \leq \theta \leq -1.80°$.
Figure 28:
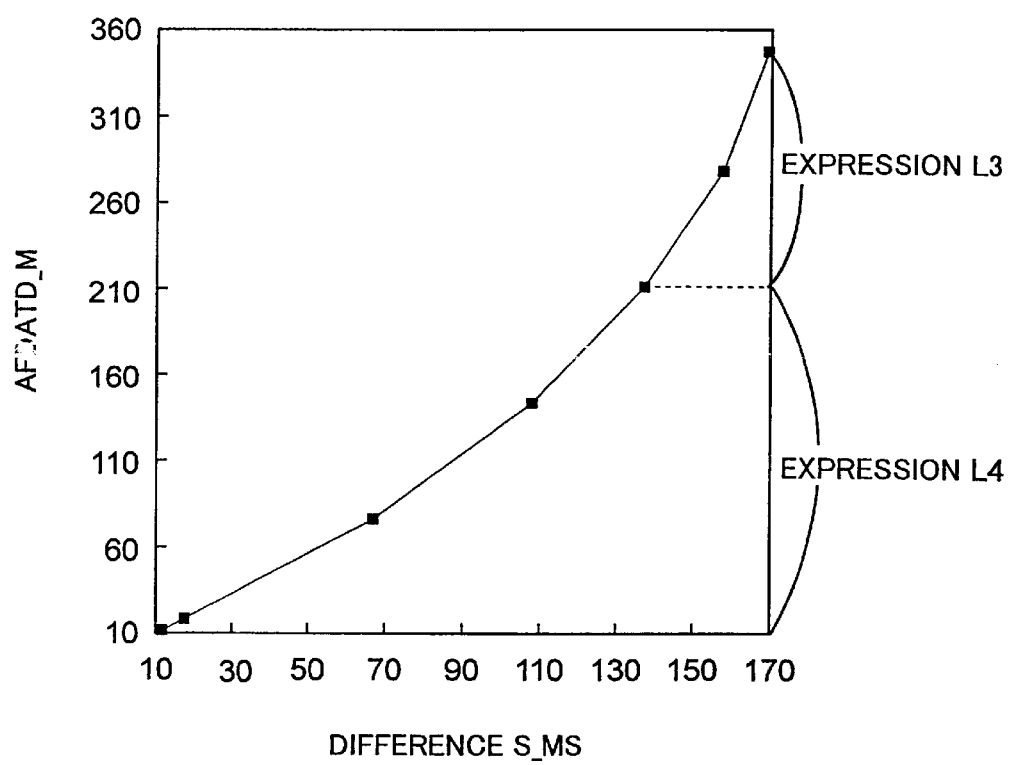
FIG. 28 is a graph showing the relationship between the amount of fluctuation AFDATD_M($\theta$) in AF signal and the difference S_MS($\theta$) within the range of $-1.80° \leq \theta \leq -1.30°$.

Each of FIGS. 25 to 28 is a graph showing the relationships between one of the differences S_MS($\theta$), S_LM($\theta$), and S_LS($\theta$) and the amount of fluctuation AFDATD_M($\theta$) in AF signal in view of the foregoing considerations. FIG. 25 is a graph showing the relationship between the amount of fluctuation AFDATD_M($\theta$) in AF signal and the difference S_MS($\theta$) within the range of $1.30°\leq\theta\leq1.80°$. FIG. 26 is a graph showing the relationship between the amount of fluctuation AFDATD_M($\theta$) in AF signal and the difference S_LM($\theta$) within the range of $1.80°\leq\theta\leq2.50°$. FIG. 27 is a graph showing the relationship between the amount of fluctuation AFDATD_M($\theta$) in AF signal and the difference S_LM($\theta$) within the range of $-2.50°\leq\theta\leq-1.80°$. FIG. 28 is a graph showing the relationship between the amount of fluctuation AFDATD_M($\theta$) in AF signal and the difference S_MS($\theta$) within the range of $-1.80°\leq\theta\leq-1.30°$.

Respective correction expressions R1 to R4 in the case of the right-side eclipse for four divided parts of range of angle $\theta$ on the right side ($\theta>0$) are set as follows:

expression R1 ($+1.3\leq\theta\leq+1.6$):

$$Y=1.881103\cdot X+58.38452 \tag{7a}$$

where X=S_MS and Y=AFDATD_M;

expression R2 ($+1.6\leq\theta\leq+1.8$):

$$Y=7.428507\cdot X+825.5276 \tag{7b}$$

where X=S_MS and Y=AFDATD_M;

expression R3 ($+1.8\leq\theta\leq+2.3$):

$$Y=2.960058\cdot X+275.5539 \tag{7c}$$

where X=S_LM and Y=AFDATD_M; and expression R4 ($+2.3\leq\theta\leq+2.5$):

$$Y=2.890578\cdot X+255.6418 \tag{7d}$$

where X=S_LM and Y=AFDATD_M. On the other hand, respective correction expressions L1 to L4 in the case of the left-side eclipse for four divided parts of range of angle $\theta$ on the left side ($\theta<0$) are set as follows:

expression L1 ($-2.5\leq\theta\leq-2.2$):

$$Y=6.101699\cdot X-878.976 \tag{8a}$$

where X=S_LM and Y=AFDATD_M;

expression L2 ($-2.2\leq\theta\leq-1.8$):

$$Y=5.24048\cdot X-658.134 \tag{8b}$$

where X=S_LM and Y=AFDATD_M;

expression L3 ($-1.8\leq\theta\leq-1.6$):

$$Y=4.254577\cdot X-371.7 \tag{8c}$$

where X=S_MS and Y=AFDATD_M; and expression L4 ($-1.6\leq\theta\leq-1.3$):

$$Y=1.580191\cdot X-14.3049 \tag{8d}$$

where X=S_LM and Y=AFDATD_M. These correction expressions are thus determined beforehand and are stored in the EEPROM 2. When the range of angle $\theta$ is divided into a plurality of parts, and correction expressions different from each other are used in thus divided respective parts as such, accurate beam eclipse corrections are possible.

Figure 29:
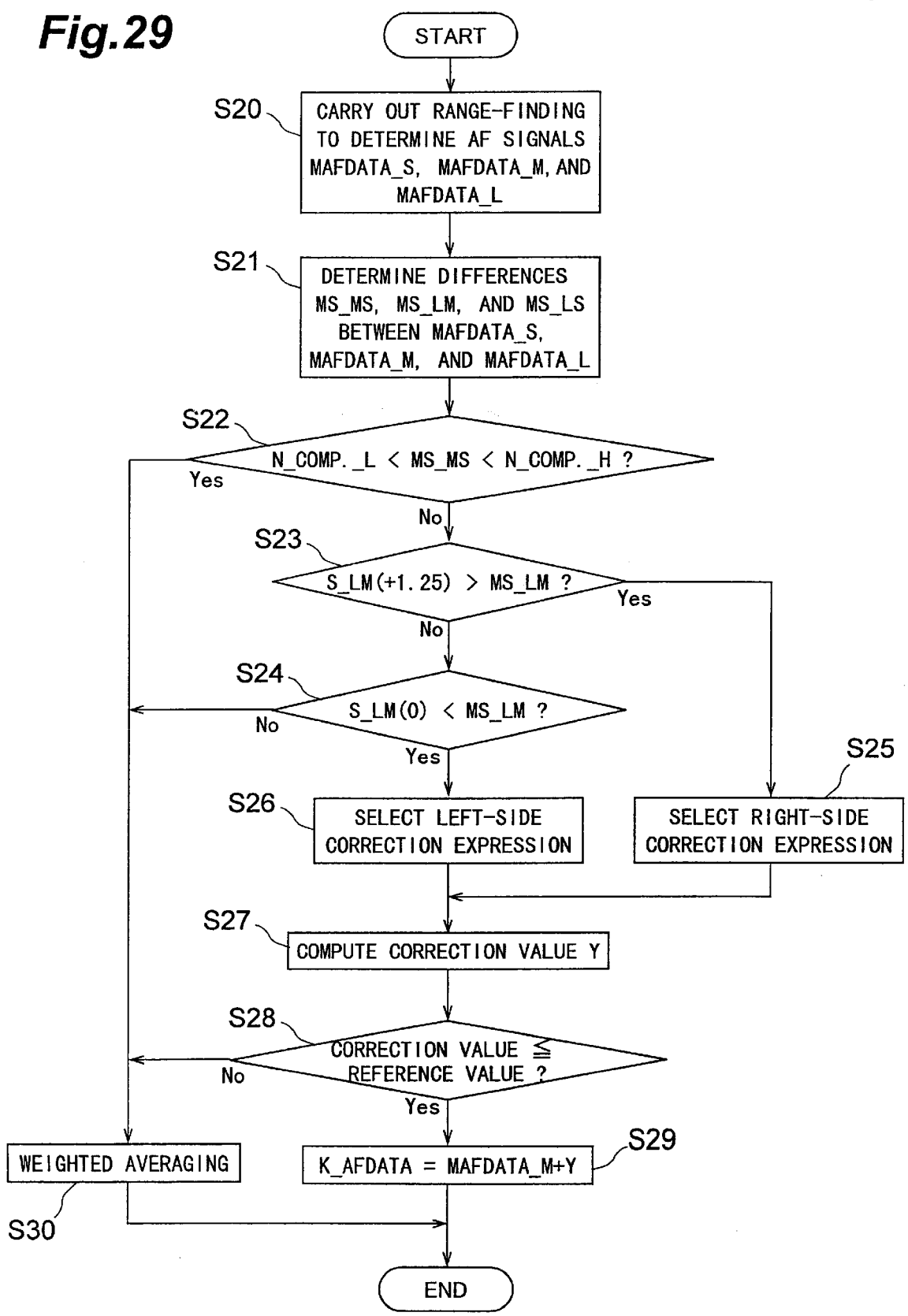
FIG. 29 is a flowchart for explaining the beam eclipse correction when a range-finding operation is carried out in the rangefinder apparatus in accordance with the above-mentioned embodiment.

FIG. 29 is a flowchart for explaining the beam eclipse correction when a range-finding operation is carried out in the rangefinder apparatus in accordance with this embodiment.

At step S20, the reference beam, the first correction beam, and the second correction beam are individually projected from the IRED 4 to the object to be measured, and their respective AF signals are determined. Namely, the respective AF signals obtained when the first correction beam, the reference beam, and the second correction beam are projected are taken as MAFDATA_S, MAFDATA_M, and MAFDATA_L.

At step S21, differences between the AF signals MAFDATA_S, MAFDATA_M, and MAFDATA_L determined at step S20 are obtained. Namely, arithmetic operations of:

$$MS\_MS=MAFDATA\_M-MAFDATA\_S \tag{9a}$$

$$MS\_LM=MAFDATA\_L-MAFDATA\_M \tag{9b}$$

$$MS\_LS=MAFDATA\_L-MAFDATA\_S \tag{9c}$$

are carried out so as to determine differences MS_MS, MS_LM, and MS_LS.

At steps S22 to S24, according to the difference MS_MS, MS_LM, or MS_LS obtained at step S21, it is determined whether a beam eclipse correction is to be carried out or not. Namely, at step S22, it is determined whether or not the value of the difference MS_MS satisfies the following relational expression:

$$N\_COMP.\_L<MS\_MS<N\_COMP.\_H \tag{10}$$

If not, the flow proceeds to step S23; otherwise, it jumps to step S30. This relational expression holds true when both of the reference beam and first correction beam hardly generate a beam eclipse or when both of them are totally eclipsed. In the former case, a correct range-finding value has been obtained according to the AF signal MAFDATA_M with respect to the reference beam, whereby it is not necessary to carry out the beam eclipse correction. In the latter case, since the beams are totally eclipsed, it is determined to be infinity, whereby no beam eclipse correction is necessary. As a consequence, unnecessary corrections are not effected, whereby the processing time is shortened, or the range-finding error would not increase upon carrying out corrections. Here, the respective values of N_COMP._L and N_COMP._H are appropriately set according to the extent of range-finding fluctuations, and are about −50 and about +50, for example.

Since whether the value of difference MS_MS satisfies the above-mentioned expression (10) or not is determined at step S22, it will be sufficient if, before this step S22, the reference beam and the first correction beam are projected from the IRED 4 to the object to be measured, so as to determine the AF signals MAFDATA_M and MAFDATA_S, and obtain the value of difference MS_MS therebetween. Namely, after step S22 and before step S23, the second correction beam may be projected from the IRED 4 to the object, so as to determine the AF signal MAFDATA_L, thereby obtaining the differences MS_LM and MS_LS. In this case, when no beam eclipse correction is to be carried out, it is not necessary to project the second correction beam from the IRED 4 to the object so as to determine the AF signal MAFDATA_L, and it is not necessary to obtain the differences MS_LM and MS_LS, whereby the total range-finding time is shortened.

At step S23, it is determined whether or not the value of difference MS_LM satisfies the relational expression of:

$$S\_LM(+1.25) > MS\_LM \quad (11)$$

If this relational expression holds true, then the flow shifts to step S25; otherwise, it proceeds to step S24. At step S24, it is determined whether or not the value of difference MS_LM satisfies the relational expression of:

$$S\_LM(0) < MS\_LM \quad (12)$$

If this relational expression holds true, then the flow proceeds to step S26; otherwise, it jumps to step S30. The case where this relational expression does not hold true indicates a state where a beam eclipse occurs only slightly in the reference beam. In this case, a permissible range-finding value can be obtained according to the AF signal MAFDATA_M with respect to the reference beam, whereby it is not necessary to carry out the beam eclipse correction.

At step S25, one of the right-side correction expressions R1 to R4 (expressions (7a) to (7d)) is selected. Here, since the difference S_LM(θ) with respect to each angle θ has no extreme value, one of the right-side correction expressions R1 to R4 is employed according to the relationship between the differences S_LM(θ) and MS_LM in terms of magnitude. Namely, one of the right-side correction expressions R1 to R4 is employed such that:

if $S\_LM(+1.6) \leq MS\_LM < S\_LM(+1.25)$, then the correction expression R1;

if $S\_LM(+1.8) \leq MS\_LM < S\_LM(+1.6)$, then the correction expression R2;

if $S\_LM(+2.3) \leq MS\_LM < S\_LM(+1.8)$, then the correction expression R3;

and if $S\_LM(+2.5) \leq MS\_LM < S\_LM(+2.3)$, then the correction expression R4. (13)

Figure 30:
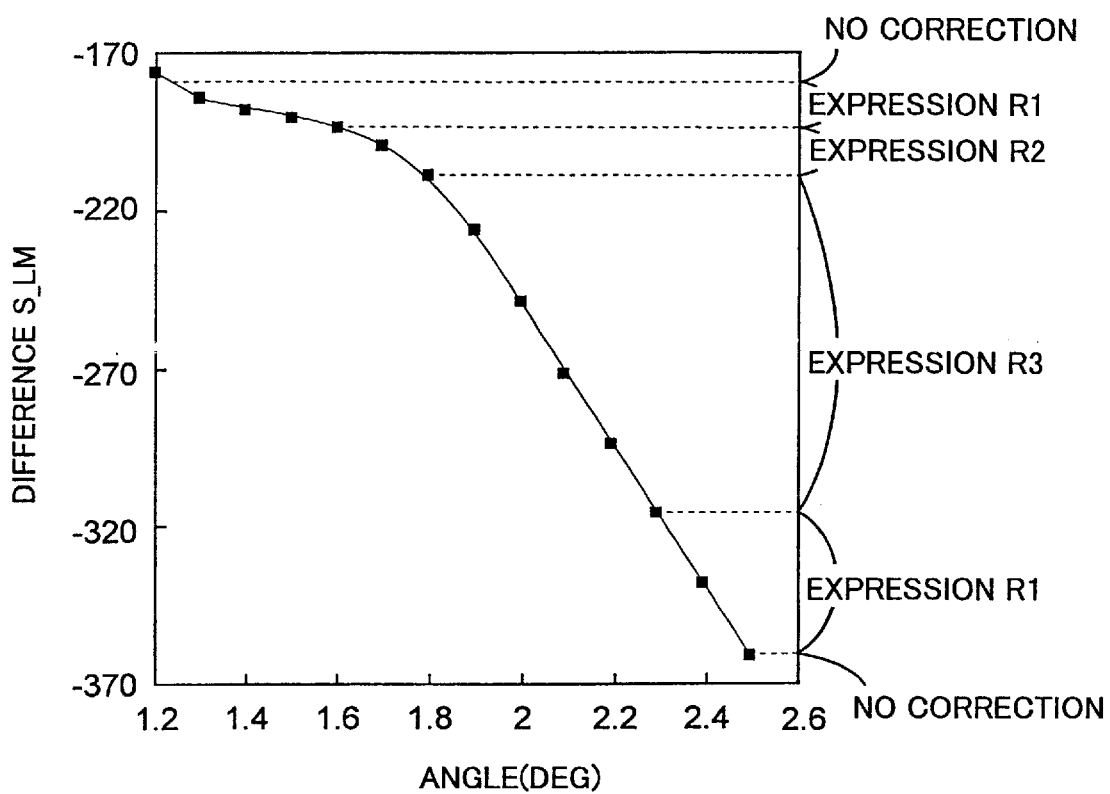
FIG. 30 is a graph showing the difference S_LM($\theta$) between the amounts of fluctuations AFDATD_L($\theta$) and AFDATD_M($\theta$) in AF signal on the right side ($\theta$>0) and respective ranges of correction expressions R1 to R4.

No correction is carried out in the other cases. FIG. 30 is a graph showing the difference S_LM(θ) and respective ranges of correction expressions R1 to R4.

At step S26, one of the right-side correction expressions L1 to L4 (expressions (8a) to (8d)) is selected. Here, since the difference S_LS(θ) with respect to each angle θ has no extreme value, one of the left-side correction expressions L1 to L4 is employed according to the relationship between the differences S_LS(θ) and MS_LS in terms of magnitude. Namely, one of the left-side correction expressions L1 to L4 is employed such that:

if $S\_LS(-2.55) \leq MS\_LS < S\_LS(-2.35)$, then the correction expression L1;

if $S\_LS(-2.35) \leq MS\_LS < S\_LS(-1.8)$, then the correction expression L2;

if $S\_LS(-1.8) \leq MS\_LS < S\_LS(-1.6)$, then the correction expression L3;

and if $S\_LS(-1.6) \leq MS\_LS < S\_LS(-1.25)$, then the correction expression L4. (14)

Figure 31:
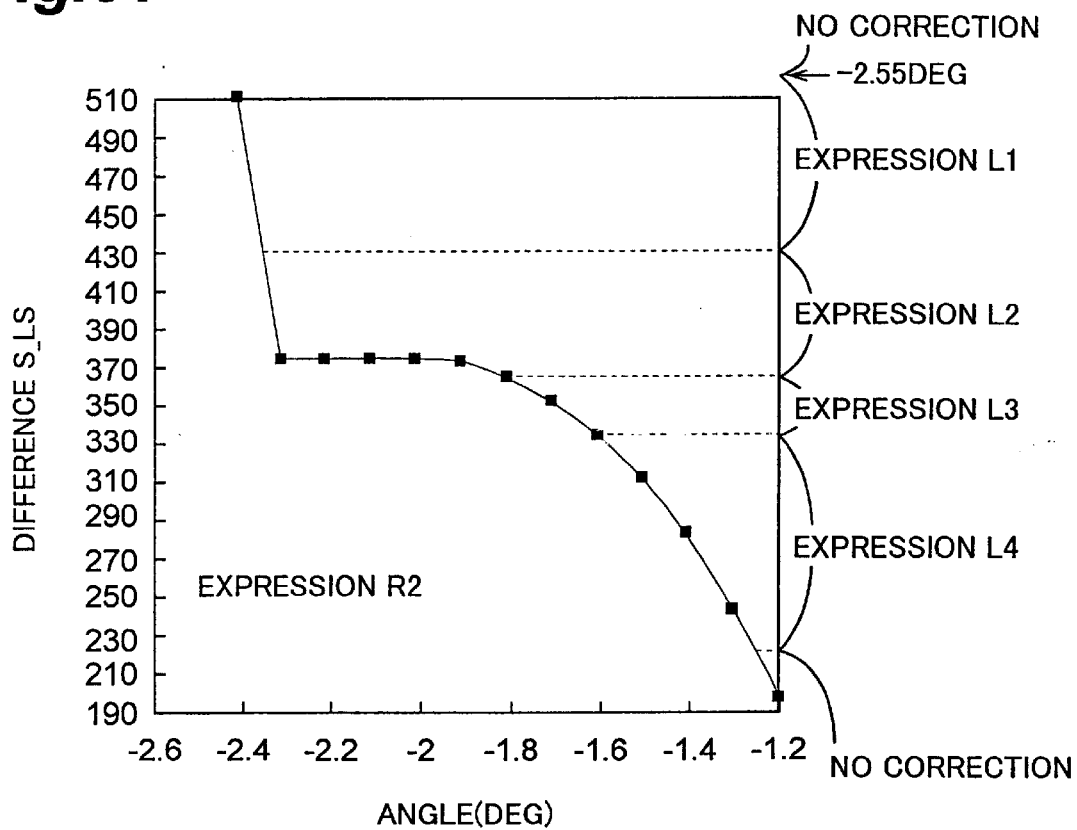
FIG. 31 is a graph showing the difference S_LS($\theta$) between the amounts of fluctuations AFDATD_L($\theta$) and AFDATD_S($\theta$) in AF signal on the left side ($\theta$<0) and respective ranges of correction expressions L1 to L4.

No correction is carried out in the other cases. FIG. 31 is a graph showing the difference S_LS(θ) and respective ranges of correction expressions L1 to L4.

As mentioned above, one of the right-side correction expressions R1 to R4 is employed according to the relationship between the differences S_LM(θ) and MS_LM in the case of the right-side beam eclipse correction at step S25, whereas one of the left-side correction expressions L1 to L4 is employed according to the relationship between the differences S_LS(θ) and MS_LS in the case of the left-side beam eclipse correction at step S26. When the correction expression is thus selected with reference to switching standards different from each other according to whether the beam eclipse is generated on the right side or left side, accurate beam eclipse corrections are possible.

At step S27, the correction value Y is computed according to the correction expression selected at step S25 or S26. At this time, if the correction expression R1, R2, L3, or L4 is selected, then the difference MS_MS is assigned to the input variable X. If the correction expression L1, L2, R3, or R4 is selected, then the difference MS_LM is assigned to the input variable X.

At step S28, it is determined whether the correction value Y computed at step S27 is greater or smaller than a reference value. If the correction value Y is greater than the reference value, then the correction value Y is considered inappropriate. As a consequence, the flow proceeds to step S30 without carrying out the correction, warning is made, or the processing is carried out again from step S20. If the correction value Y is not greater than the reference value, then the correction value Y is considered to fall within an appropriate range, whereby the flow proceeds to step S29.

Preferably, the reference value is set with reference to the distance to the object to be measured that is obtained according to the result of adding the correction value Y to the AF signal MAFDATA_M. Namely, when the distance is short (e.g., 1 m or less), the beam eclipse is hard to occur since the object to be measured (the object to be photographed) occupies a large portion of the picture taken by the camera. As a consequence, if it is determined that a beam eclipse is generated, then the rangefinder apparatus is considered to be abnormal. Therefore, the reference value is set smaller than that in the case where the distance is within a medium range. If the distance is long (e.g., 3 m or longer), then the range-finding fluctuations may enhance such that the accuracy in beam eclipse correction deteriorates. Also, a certain constant distance or longer may be determined substantially infinity. Therefore, the reference value is set smaller than that in the case where the distance is within the medium range.

At step S29, the correction value Y computed at step S27 is added to the AF signal MAFDATA_M obtained at step S20 upon projecting the reference beam, so as to determine the corrected AF signal K_AFDATA according to the following expression:

$$K\_AFDATA = MAFDATA\_M + Y \quad (15)$$

Then, a distance signal is determined according to this corrected AF signal K_AFDATA.

At step S30, on the other hand, a weighted average of at least two of the AF signals MAFDATA_S, MAFDATA_M, and MAFDATA_L is obtained by weighting them according to the respective emission light intensities of the individual beams. As long as the emission light intensity distribution is uniform, the greater is the light-emitting area, the higher becomes the emission light intensity, and the better becomes the range-finding accuracy, whereby the amount of weighting is successively enhanced in the AF signals MAFDATA_L, MAFDATA_M, and MAFDATA_S in this order. A weighted average of all the three AF signals or of any two AF signals may be determined. Then, the distance signal is determined according to the resulting weighted average of AF signals. At step S30, one of the AF signals MAFDATA_S, MAFDATA_M, and MAFDATA_L (e.g., the AF signal MAFDATA_M in response to the reference beam) determined at step S20 may be employed without weighted averaging.

Figure 32:
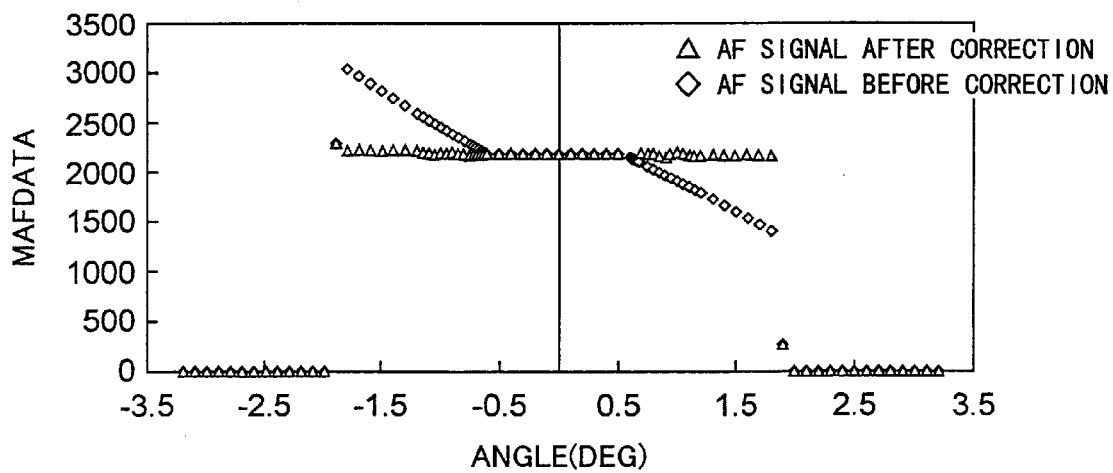
FIG. 32 is a graph showing respective angle $\theta$ dependence characteristics in the AF signal MAFDATA_M before correction and the AF signal K_AFDATA after correction concerning the reference beam.
Figure 33:
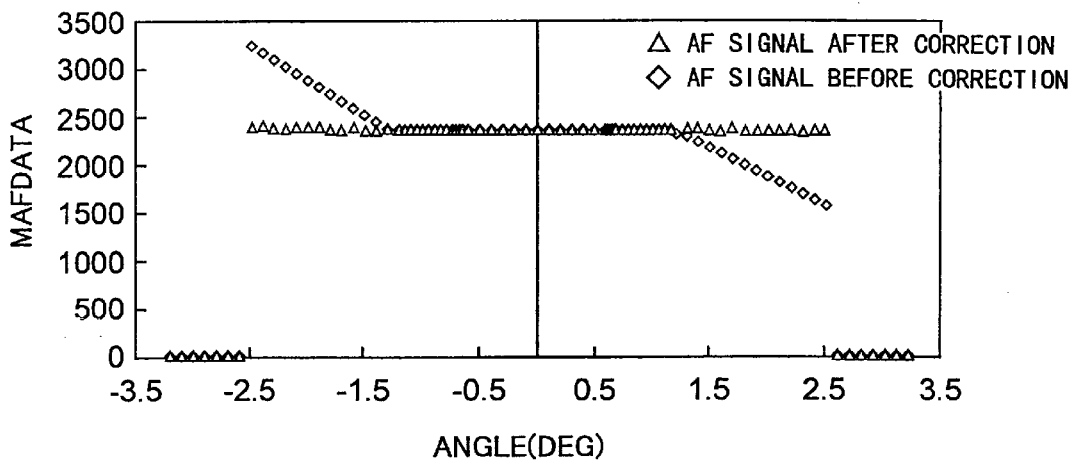
FIG. 33 is a graph showing respective angle $\theta$ dependence characteristics in the AF signal MAFDATA_M before correction and the AF signal K_AFDATA after correction concerning the reference beam.
Figure 34:
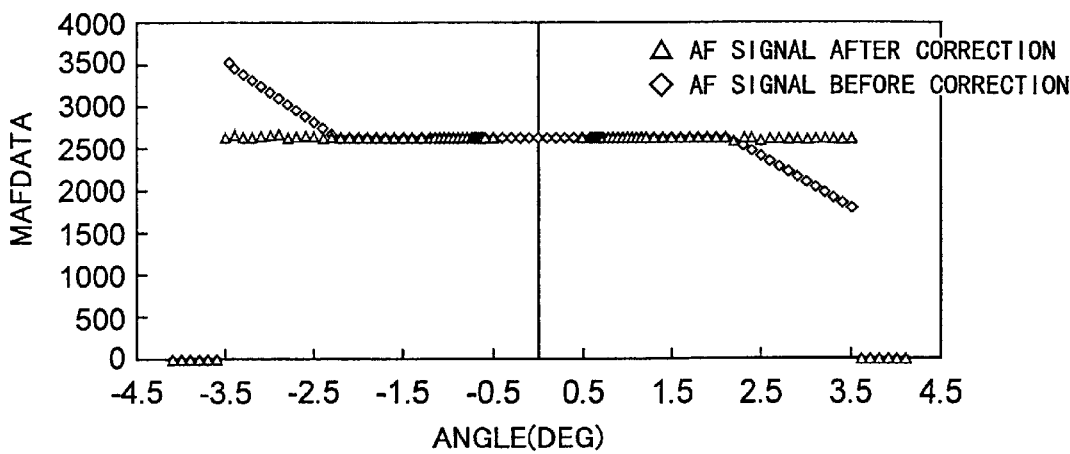
FIG. 34 is a graph showing respective angle $\theta$ dependence characteristics in the AF signal MAFDATA_M before correction and the AF signal K_AFDATA after correction concerning the reference beam.

FIGS. 32 to 34 are graphs showing respective angle θ dependence characteristics in AF signal MAFDATA_M before correction and AF signal K_AFDATA after correction concerning the reference beam. FIGS. 32 to 34 show the cases where the distance to the object to be measured is 3427 mm, 2240 mm, and 1500 mm, respectively.

In the case where the distance to the object is 3427 mm (FIG. 32), no influence of the beam eclipse appears in the AF signal MAFDATA_M before correction within the range of $-0.6 \leq \theta \leq +0.6$. Within the range of $-1.8 \leq \theta < -0.6$ or $+0.6 < \theta \leq +1.8$, influences of the beam eclipse appear in the AF signal MAFDATA_M before correction, but are eliminated from the AF signal K_AFDATA after the beam eclipse correction is carried out. In the other ranges of angle θ, the reference beam is totally eclipsed.

In the case where the distance to the object is 2240 mm (FIG. 33), no influence of the beam eclipse appears in the AF signal MAFDATA_M before correction within the range of $-1.3 \leq \theta \leq +1.3$. Within the range of $-2.5 \leq \theta < -1.3$ or $+1.3 < \theta \leq +2.5$, influences of the beam eclipse appear in the AF signal MAFDATA_M before correction, but are eliminated from the AF signal K_AFDATA after the beam eclipse correction is carried out. In the other ranges of angle θ, the reference beam is totally eclipsed.

In the case where the distance to the object is 1500 mm (FIG. 34), no influence of the beam eclipse appears in the AF signal MAFDATA_M before correction within the range of $-2.3 \leq \theta \leq +2.3$. Within the range of $-3.5 \leq \theta < -2.3$ or $+2.3 < \theta \leq +3.5$, influences of the beam eclipse appear in the AF signal MAFDATA_M before correction, but are eliminated from the AF signal K_AFDATA after the beam eclipse correction is carried out. In the other ranges of angle θ, the reference beam is totally eclipsed.

As explained in the foregoing, even in the case where a beam eclipse is generated, if the beam eclipse is partial, then an accurate AF signal can be determined by carrying out the above-mentioned beam eclipse correction. When a laterally asymmetrical reference beam is employed, the correctable range of angle θ on the right side is substantially on the same order as that on the left side.

As a consequence, even if the base-length distance between the IRED 4 and the PSD 5 is short, and the fluctuation in center-of-gravity position of the received light beam caused by the beam eclipse is large, accurate range-finding can be carried out according to the beam eclipse correction. Therefore, the base-length distance can be shortened, and the rangefinder apparatus and the camera mounted therewith can be made smaller. Also, when the distance between the IRED 4 and the light-projecting lens is made shorter, and the F number of the light-projecting lens is made smaller, though beam eclipses are more likely to occur in the beam projected to the object to be measured, accurate range-finding can be carried out according to the beam eclipse correction. The rangefinder apparatus and camera can be made smaller in view of this point as well.

Figure 35:
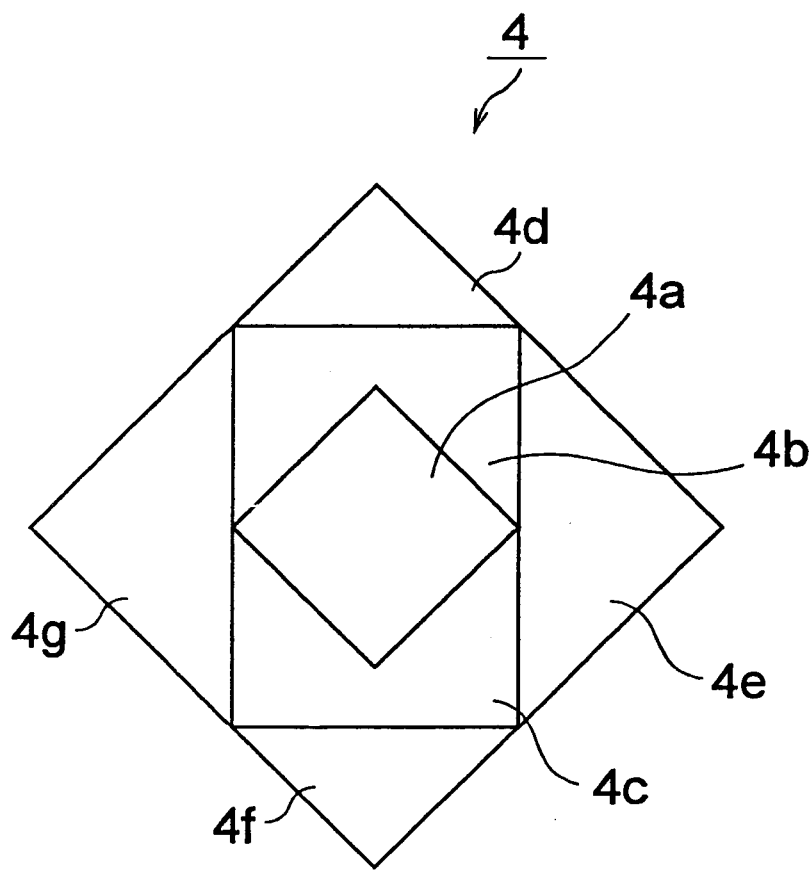
FIG. 35 is a view for explaining another example of IRED in the rangefinder apparatus in accordance with the above-mentioned embodiment.

Though the beam eclipse correction is explained in the foregoing while assuming that the reference beam has an asymmetrical form as shown in FIG. 7, the present invention should not be restricted thereto. In the following, the beam eclipse correction will be explained while assuming that each of the rectangular reference beam, first correction beam, and second correction beam shown in FIG. 35 is symmetrical. The flowchart for explaining how to determine a correction expression used for correcting the beam eclipse in this case is similar to that shown in FIG. 21. Also, the flowchart for explaining the beam eclipse correction when carrying out a range-finding operation in this case is similar to that shown in FIG. 29.

FIG. 35 is a view for explaining another example of the IRED 4 in the rangefinder apparatus in accordance with this embodiment. This drawing shows the light-emitting surface of the IRED 4 from the object side. The light-emitting surface of the IRED 4 shown in this drawing is divided into seven light-emitting areas 4a to 4g. The IRED 4 is driven by the driver 3, such that only the light-emitting area 4a emits light to project the first correction beam, only three light-emitting areas 4a to 4c emit light to project the reference beam, and all the seven light-emitting areas 4a to 4g emit light to project the second correction beam. Both of the first and second correction beams have a square cross section having one diagonal parallel to the base-length direction, while their beam sizes are different from each other. The reference beam has a rectangular cross section, with two of sides thereof being parallel to the base-length direction. Namely, the reference beam, the first correction beam, and the second correction beam have emission light intensity distributions different from each other. Also, the reference beam, the first correction beam, and the second correction beam have an identical emission center-of-gravity position with respect to the base-length direction. In the reference beam, each of the sides parallel to the base-length direction has a length of 0.296 mm, whereas each of the other sides has a length of 0.388 mm. The diagonal length of the first correction beam is 0.296 mm. The diagonal length of the second correction beam is 0.684 mm.

Figure 36:
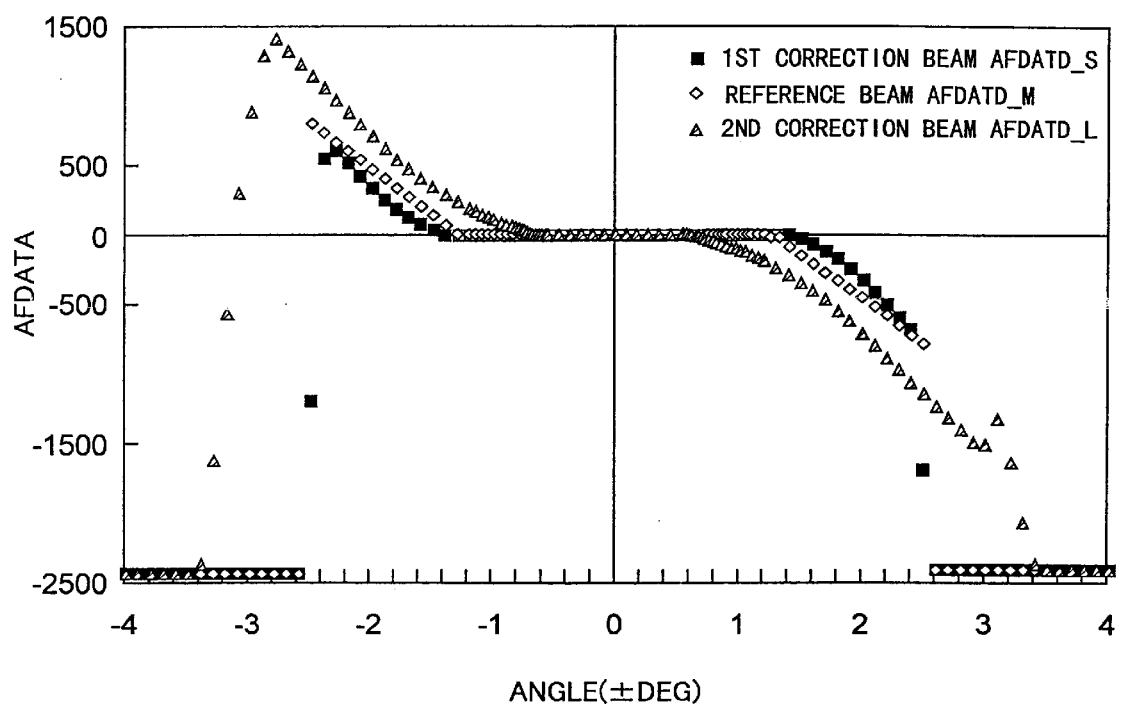
FIG. 36 is a graph showing amounts of fluctuations AFDATD_S($\theta$), AFDATD_M($\theta$), and AFDATD_L($\theta$) in AF signal with respect to the camera rotational angle ($\theta$)

FIG. 36 is a graph showing amounts of fluctuations AFDATD_S(θ), AFDATD_M(θ), and AFDATD_L(θ) in AF signal with respect to the camera rotational angle θ which are determined at step S12 when the laterally symmetrical rectangular beam is employed as the reference beam. When the cases where the reference beam is laterally asymmetrical (a rectangle with a semicircle; FIG. 22) and where the reference beam is laterally symmetrical (a rectangle; FIG. 36) are compared with each other, the amount of fluctuation AFDATD_M(θ) in AF signal slightly varies therebetween.

Figure 37:
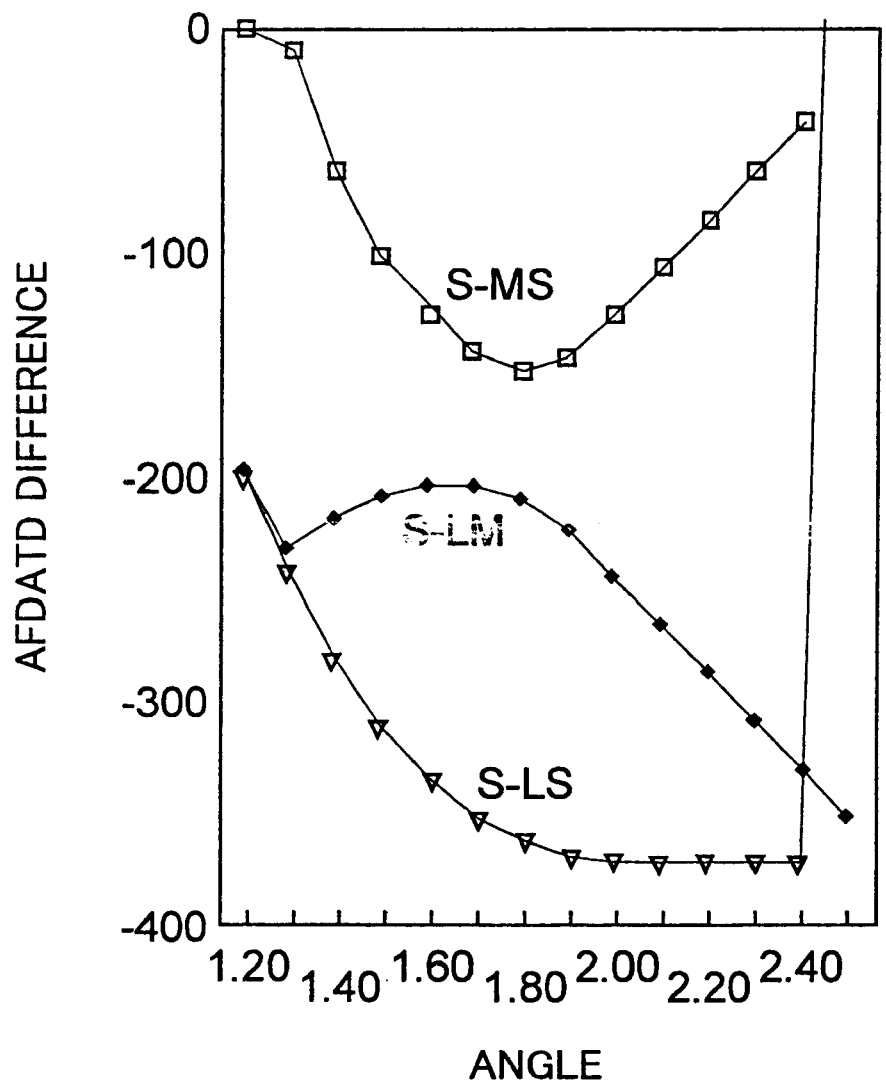
FIG. 37 is a graph showing differences S_MS($\theta$), S_LM($\theta$), and S_LS($\theta$) between the amounts of fluctuations AFDATD_S($\theta$), AFDATD_M($\theta$), and AFDATD_L($\theta$) in AF signal.
Figure 38:
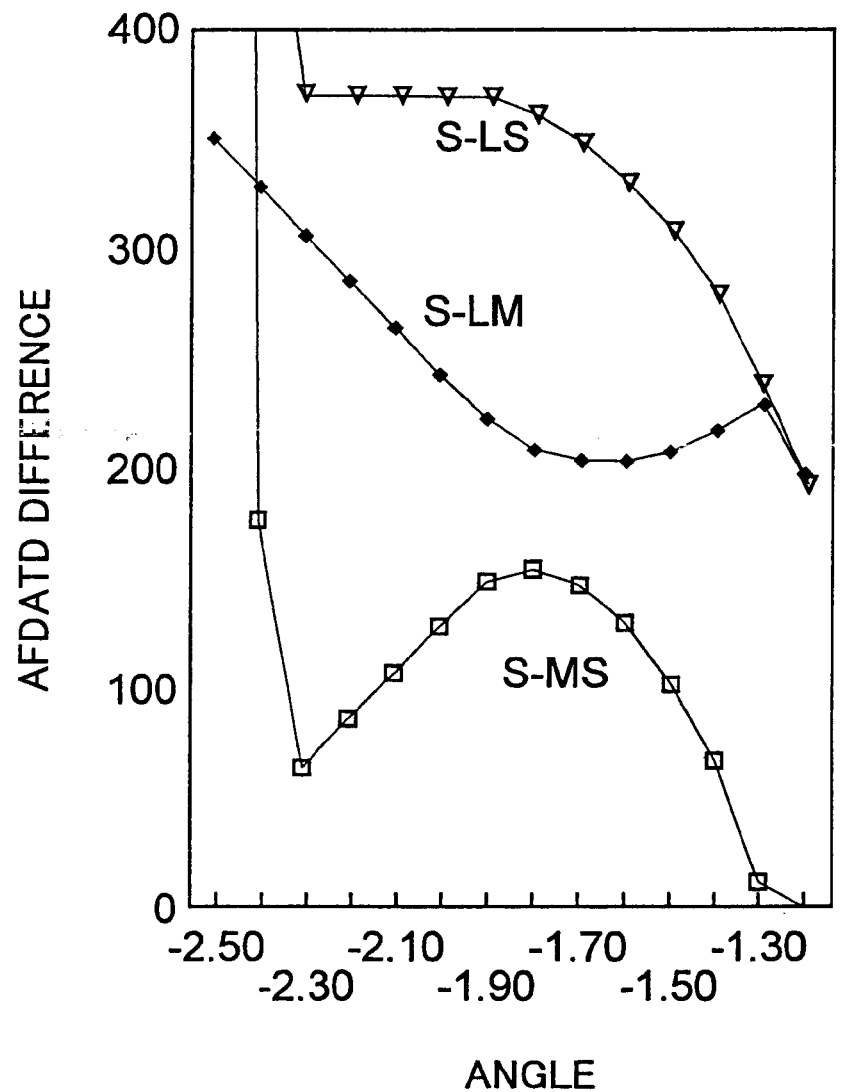
FIG. 38 is a graph showing differences S_MS($\theta$), S_LM($\theta$), and S_LS($\theta$) between the amounts of fluctuations AFDATD_S($\theta$), AFDATD_M($\theta$), and AFDATD_L($\theta$) in AF signal.

FIGS. 37 and 38 a regraphs showing differences S_MS(θ), S_LM(θ), and S_LS(θ) determined at step S13 when the laterally symmetrical rectangular beam is employed as the reference beam. FIGS. 37 and 38 show the right side (θ>0) and the left side (θ<0), respectively. When the cases where the reference beam is laterally asymmetrical (a rectangle with a semicircle; FIGS. 23 and 24) and where the reference beam is laterally symmetrical (a rectangle; FIGS. 37 and 38) are compared with each other, they differ from each other in that the difference S_LM(θ) on the right side (θ>0) does not have an extreme value in the former, but in the latter.

Figure 39:
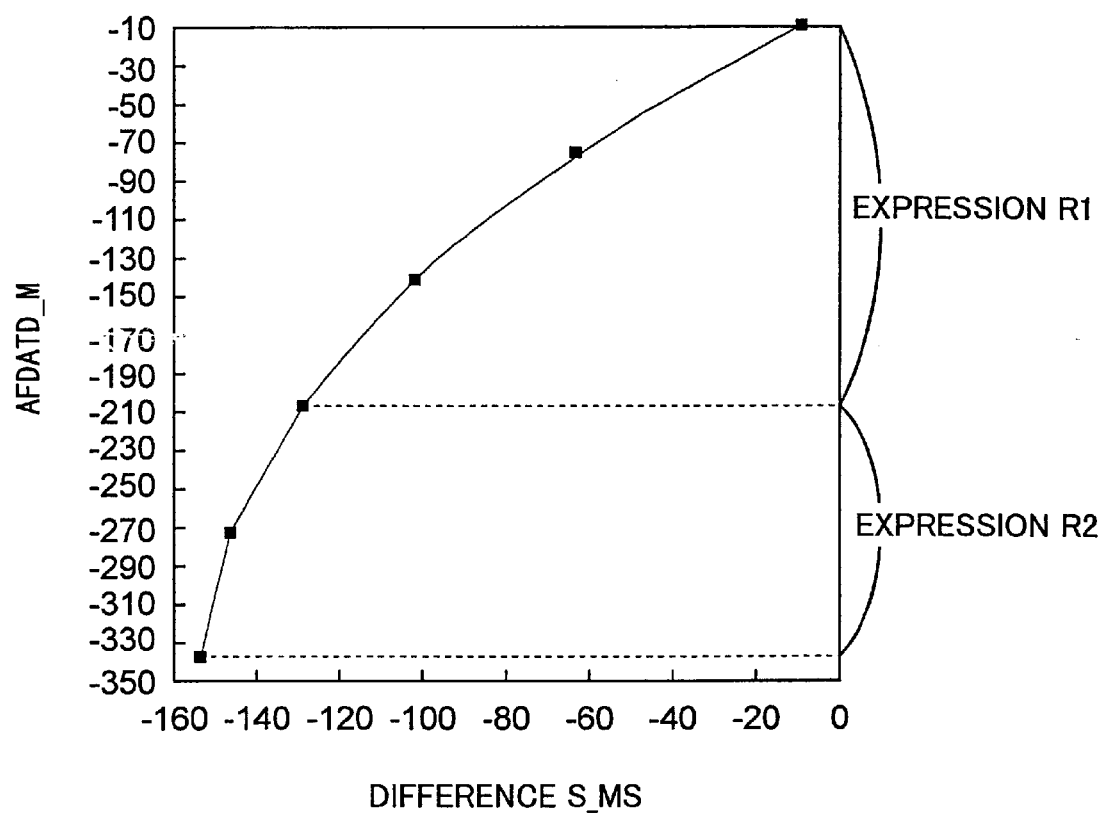
FIG. 39 is a graph showing the relationship between the amount of fluctuation AFDATD_M($\theta$) in AF signal and the difference S_MS($\theta$) within the range of $1.30° \leq \theta \leq 1.80°$.
Figure 40:
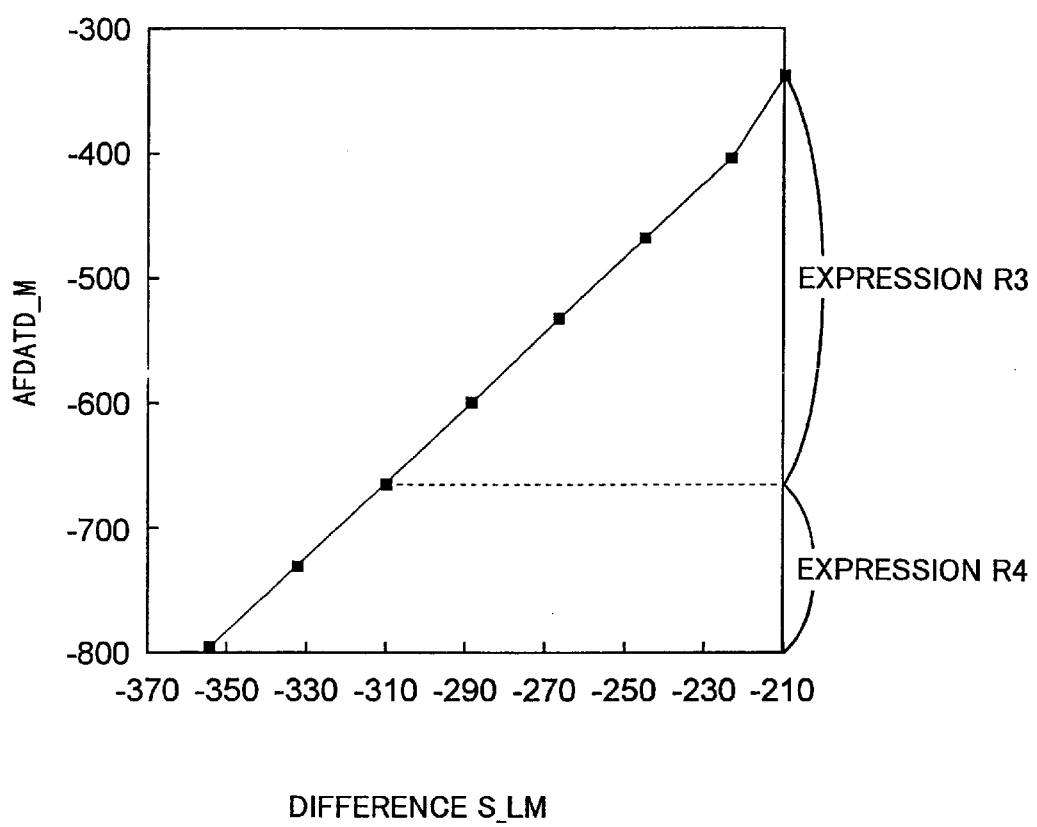
FIG. 40 is a graph showing the relationship between the amount of fluctuation AFDATD_M(θ) in AF signal and the difference S_LM(θ) within the range of 1.80°≦θ≦2.50°.
Figure 41:
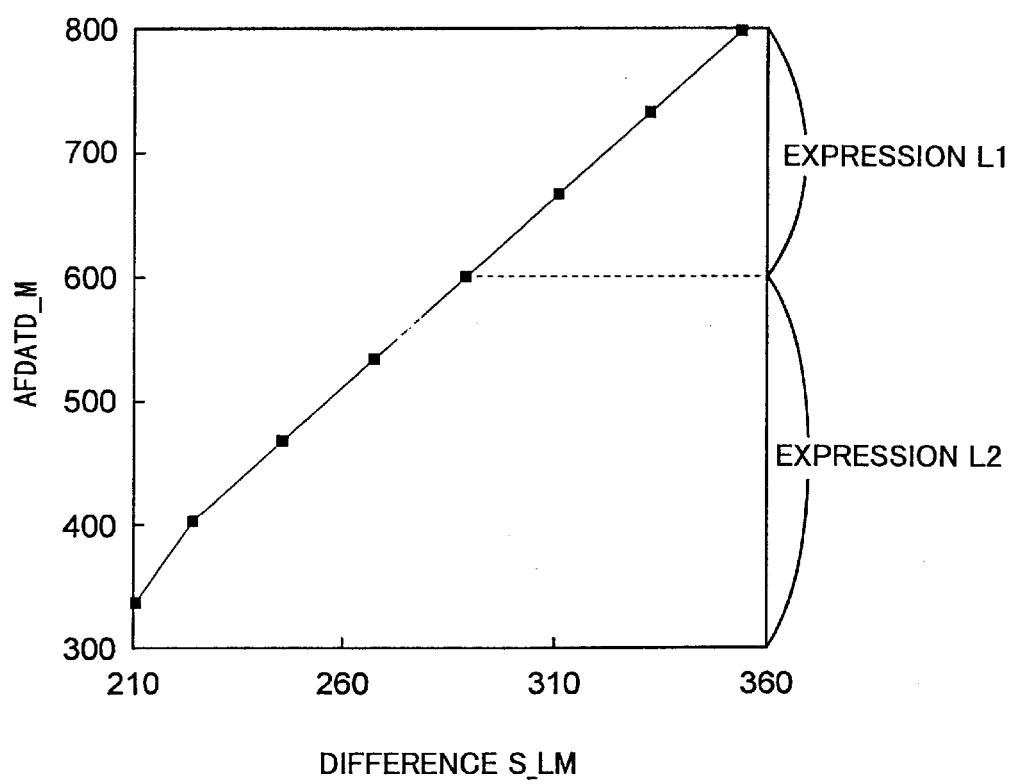
FIG. 41 is a graph showing the relationship between the amount of fluctuation AFDATD_M(θ) in AF signal and the difference S_LM(θ) within the range of −2.50°≦θ≦−1.80°.
Figure 42:
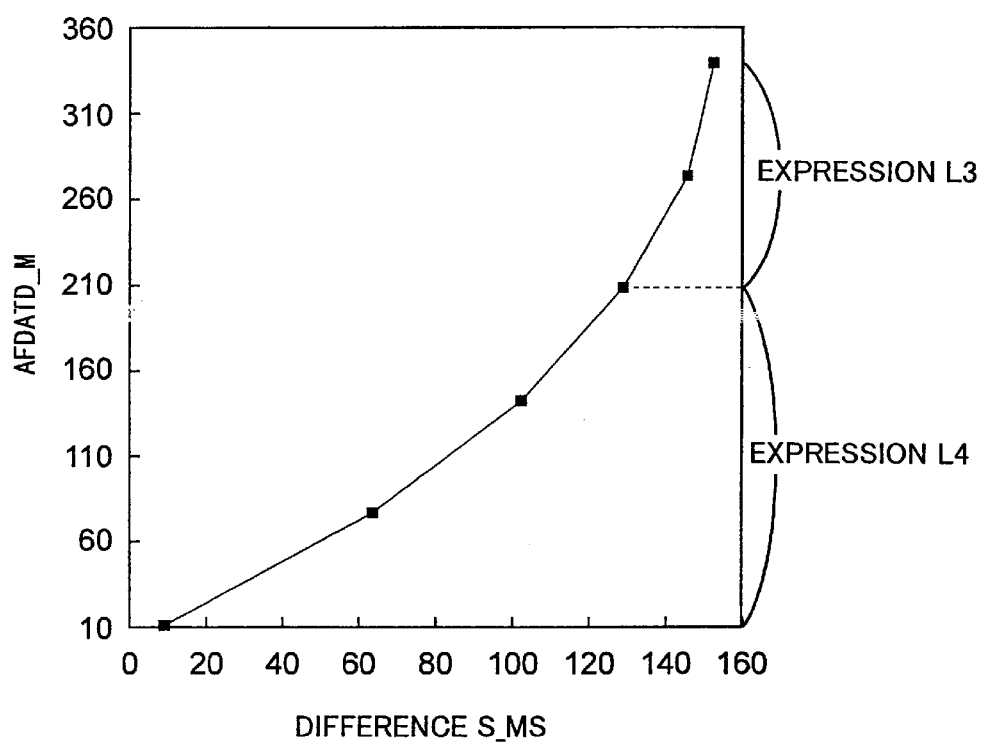
FIG. 42 is a graph showing the relationship between the amount of fluctuation AFDATD_M(θ) in AF signal and the difference S_MS(θ) within the range of −1.80°≦θ≦−1.30°.

Each of FIGS. 39 to 42 shows the relationship between one of the differences S_MS(θ), S_LM(θ), and S_LS(θ) and the amount of fluctuation AFDATD_M(θ) in AF signal when the laterally symmetrical rectangular beam is employed as the reference beam at step S14. FIG. 39 is a graph showing the relationship between the amount of fluctuation AFDATD_M(θ) in AF signal and the difference S_MS(θ) within the range of $1.30° \leq \theta \leq 1.80°$. FIG. 40 is a graph showing the relationship between the amount of fluctuation AFDATD_M(θ) in AF signal and the difference S_LM(θ) within the range of $1.80° \leq \theta \leq 2.50°$. FIG. 41 is a graph showing the relationship between the amount of fluctuation AFDATD_M(θ) in AF signal and the difference S_LM(θ) within the range of $-2.50° \leq \theta \leq -1.80°$. FIG. 42 is a graph showing the relationship between the amount of fluctuation AFDATD_M(θ) in AF signal and the difference S_MS(θ) within the range of $-1.80° \leq \theta \leq -1.30°$.

Respective correction expressions R1 to R4 in the case of the right-side eclipse for four divided parts of range of angle θ on the right side (θ>0) are set as follows:

expression R1 ($+1.3 \leq \theta \leq +1.6$):

$$Y = 1.60635 \cdot X + 14.5165 \tag{16a}$$

where X=S_MS and Y=AFDATD_M;

expression R2 ($+1.6 \leq \theta \leq +1.8$):

$$Y = 5.1583 \cdot X + 468.45 \tag{16b}$$

where X=S_MS and Y=AFDATD_M;

expression R3 ($+1.8 \leq \theta \leq +2.3$):

$$Y = 3.18481 \cdot X + 317.792 \tag{16c}$$

where X=S_LM and Y=AFDATD_M; and expression R4 ($+2.3 \leq \theta \leq +2.5$):

$$Y = 3.0 \cdot X + 265.314 \tag{16d}$$

where X=S_LM and Y=AFDATD_M. On the other hand, respective correction expressions L1 to L4 in the case of the left-side eclipse for four divided parts of range of angle θ on the left side (θ<0) are set as follows:

expression L1 ($-2.5 \leq \theta \leq -2.2$):

$$Y = 3.0 \cdot X - 265.314 \tag{17a}$$

where X=S_LM and Y=AFDATD_M;

expression L2 ($-2.2 \leq \theta \leq -1.8$):

$$Y = 3.262046 \cdot X - 335.873 \tag{17b}$$

where X=S_LM and Y=AFDATD_M;

expression L3 ($-1.8 \leq \theta \leq -1.6$):

$$Y = 5.158295 \cdot X - 468.45 \tag{17c}$$

where X=S_MS and Y=AFDATD_M; and expression L4 ($-1.6 \leq \theta \leq -1.3$):

$$Y = 1.606354 \cdot X - 14.5165 \tag{17d}$$

where X=S_LM and Y=AFDATD_M.

Figure 43:
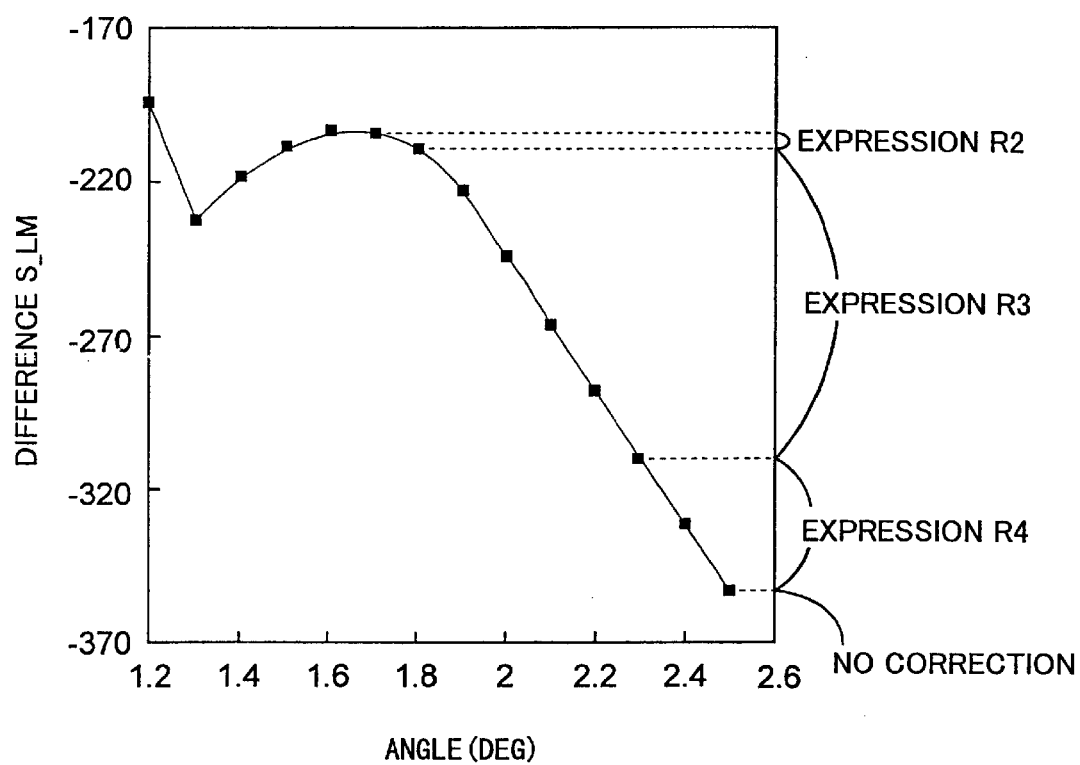
FIG. 43 is a graph showing the difference S_LM(θ) between the amounts of fluctuations AFDATD_L(θ) and AFDATD_M(θ) in AF signal on the right side (θ>0) and respective ranges of correction expressions R1 to R4.
Figure 44:
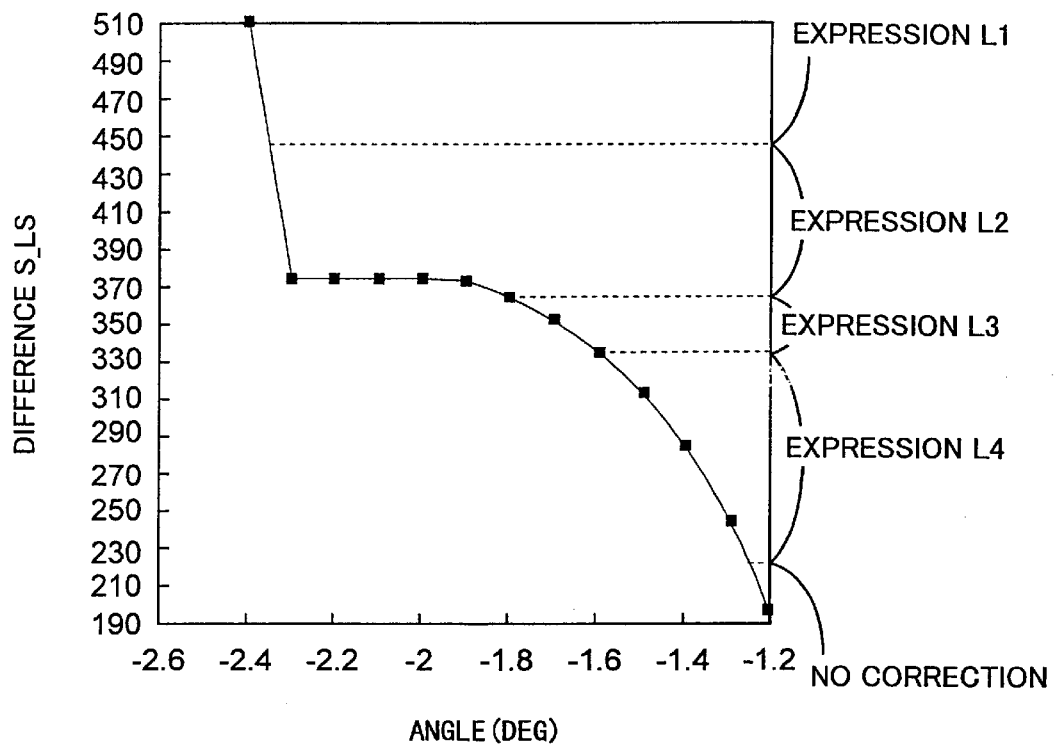
FIG. 44 is a graph showing the difference S_LS(θ) between the amounts of fluctuations AFDATD_L(θ) and AFDATD_S(θ) in AF signal on the left side (θ<0) and respective ranges of correction expressions L1 to L4.

FIG. 43 is a graph showing the difference S_LM(θ) and respective ranges of correction expressions R1 to R4 at step S25 when the laterally symmetrical rectangular beam is employed as the reference beam. On the other hand, FIG. 44 is a graph showing the difference S_LS(θ) and respective ranges of correction expressions L1 to L4 at step S26 when the laterally symmetrical rectangular beam is employed as the reference beam.

Figure 45:
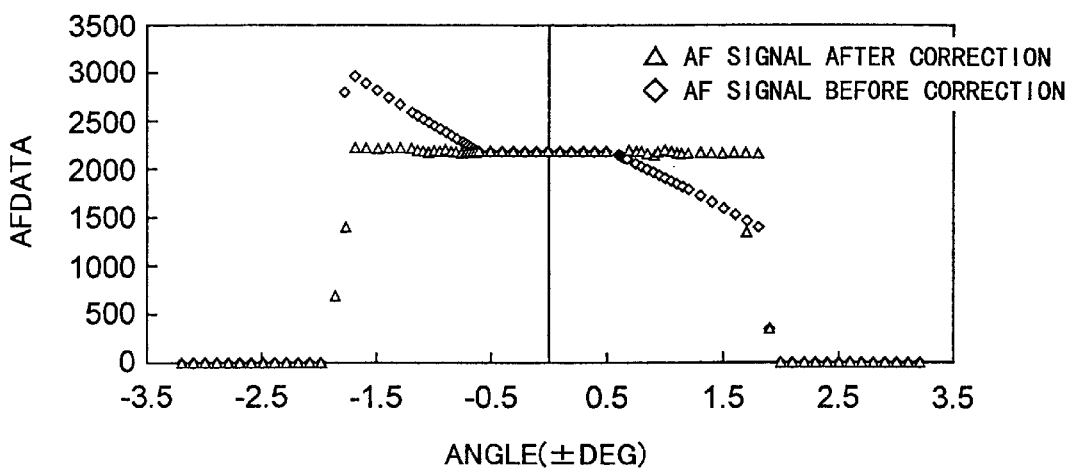
FIG. 45 is a graph showing respective angle θ dependence characteristics of the AF signal MAFDATA_M before correction and the AF signal K_AFDATA after correction concerning the reference beam.
Figure 46:
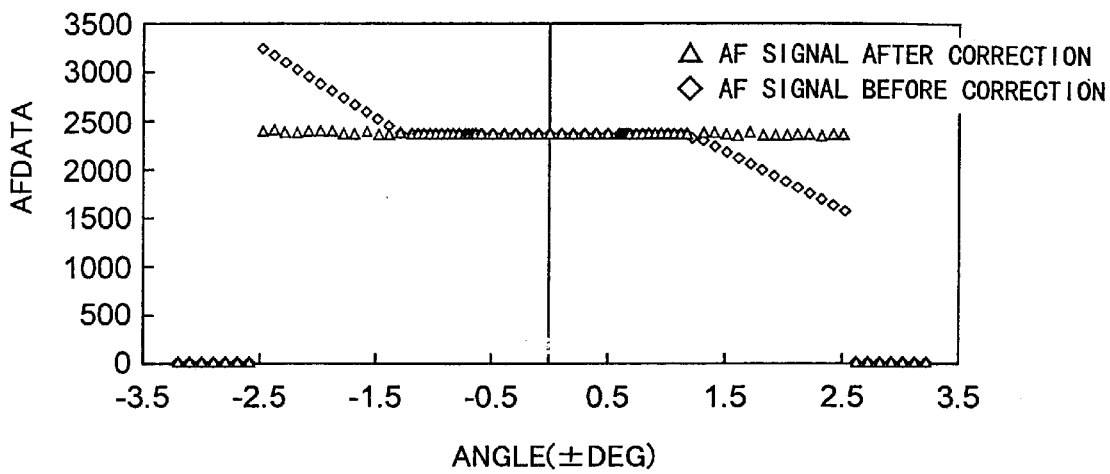
FIG. 46 is a graph showing respective angle θ dependence characteristics of the AF signal MAFDATA_M before correction and the AF signal K_AFDATA after correction concerning the reference beam.
Figure 47:
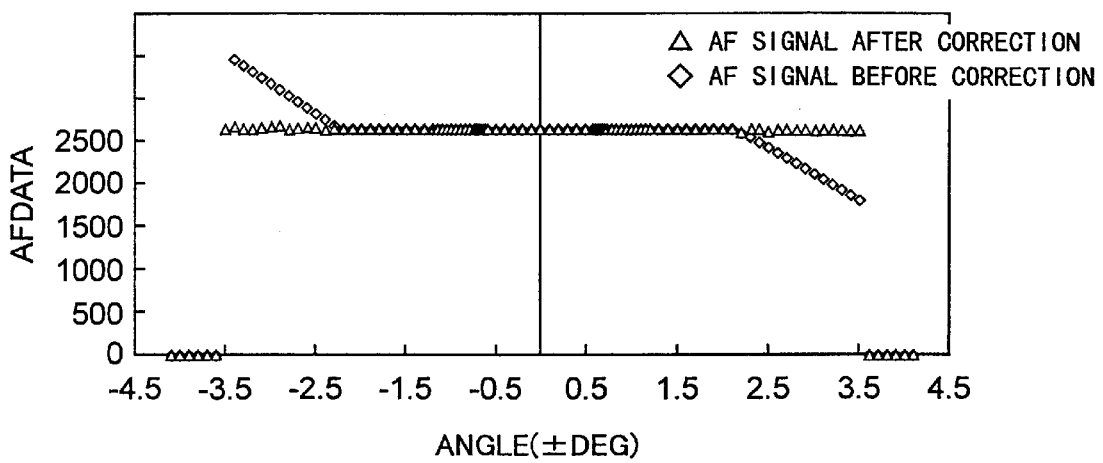
FIG. 47 is a graph showing respective angle θ dependence characteristics of the AF signal MAFDATA_M before correction and the AF signal K_AFDATA after correction concerning the reference beam.

FIGS. 45 to 47 are graphs showing respective angle θ dependence characteristics in AF signal MAFDATA_M before correction and AF signal K_AFDATA after correction concerning the reference beam in the case where the laterally symmetrical rectangular beam is employed as the reference beam. FIGS. 45 to 47 show the cases where the distance to the object to be measured is 3427 mm, 2240 mm, and 1500 mm, respectively.

In the case where the distance to the object is 3427 mm (FIG. 45), no influence of the beam eclipse appears in the AF signal MAFDATA_M before correction within the range of $-0.6 \leq \theta \leq +0.6$. Within the range of $-1.7 \leq \theta < -0.6$ or $+0.6 < \theta \leq +1.6$, influences of the beam eclipse appear in the AF signal MAFDATA_M before correction, but are eliminated from the AF signal K_AFDATA after the beam eclipse correction is carried out. In the other ranges of angle θ, the reference beam is totally eclipsed or has not been corrected. When compared with FIG. 32 in which the laterally asymmetrical reference beam is used, the range of angle θ in which the beam eclipse correction is appropriately carried out is laterally asymmetrical in the case where the laterally symmetrical rectangular beam is employed as the reference beam.

In the case where the distance to the object is 2240 mm (FIG. 46), no influence of the beam eclipse appears in the AF signal MAFDATA_M before correction within the range of $-1.3 \leq \theta \leq +1.3$. Within the range of $-2.5 \leq \theta < -1.3$ or $+1.3 < \theta \leq +2.4$, influences of the beam eclipse appear in the AF signal MAFDATA_M before correction, but are eliminated from the AF signal K_AFDATA after the beam eclipse correction is carried out. In the other ranges of angle θ, the reference beam is totally eclipsed or has not been corrected. When compared with FIG. 33 in which the laterally asymmetrical reference beam is used, the range of angle θ in which the beam eclipse correction is appropriately carried out is laterally asymmetrical in the case where the laterally symmetrical rectangular beam is employed as the reference beam.

In the case where the distance to the object is 1500 mm (FIG. 47), no influence of the beam eclipse appears in the AF signal MAFDATA_M before correction within the range of $-2.3 \leq \theta \leq +2.3$. Within the range of $-3.5 \leq \theta < -2.3$ or $+2.3 < \theta \leq +3.4$, influences of the beam eclipse appear in the AF signal MAFDATA_M before correction, but are eliminated from the AF signal K_AFDATA after the beameclipse correction is carried out. In the other ranges of angle θ, the reference beam is totally eclipsed or has not been corrected. When compared with FIG. 34 in which the laterally asymmetrical reference beam is used, the range of angle θ in which the beam eclipse correction is appropriately carried out is laterally asymmetrical in the case where the laterally symmetrical rectangular beam is employed as the reference beam.

As explained in the foregoing, even in the case where a beam eclipse is generated in a laterally symmetrical reference beam, if the beam eclipse is partial, then an accurate AF signal can be determined by carrying out the above-mentioned beam eclipse correction. Also, the base-length distance can be decreased in this case as well, so that the distance between the IRED 4 and the light-projecting lens can be made shorter, and the F number of the light-projecting lens can be made smaller, whereby the rangefinder apparatus and camera can be made smaller. Here, the range of angle θ in which the beam eclipse correction is appropriately carried out becomes laterally symmetrical in the case where a laterally asymmetrical reference beam is employed, whereas it becomes laterally asymmetrical in the case where a laterally symmetrical reference beam is employed. Therefore, for attaining a laterally symmetrical range of angle θ in which the beam eclipse correction is appropriately carried out, it is preferable to employ a laterally asymmetrical reference beam.

Figure 48:
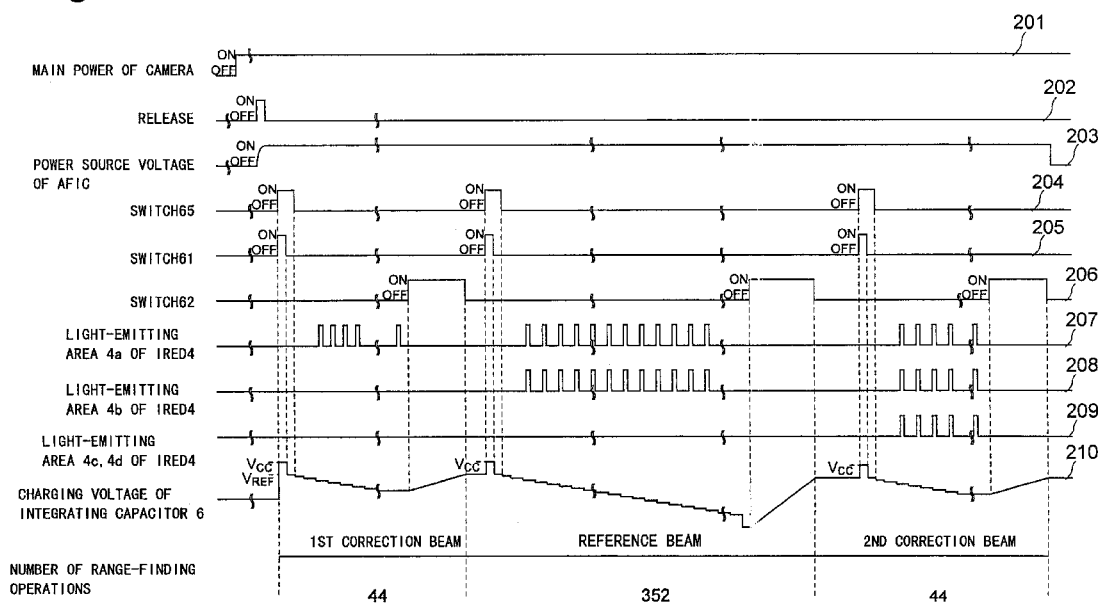
FIG. 48 is a timing chart for explaining operations of the rangefinder apparatus in accordance with the above-mentioned embodiment.

Operations of the rangefinder apparatus in accordance with this embodiment, those at step S20 of the flowchart in FIG. 29 in particular, will now be explained. The following explanation relates to the case of the IRED 4 shown in FIG. 7. FIG. 48 is a timing chart for explaining the operation of the rangefinder apparatus in accordance with this embodiment. This timing chart indicates, successively from the upper side, ON/OFF 201 of the main power source of the camera mounted with this rangefinder apparatus, ON/OFF 202 of the release button for commanding range-finding and photographing operations, ON/OFF 203 of the power source voltage of the AFIC 10, ON/OFF 204 of the switch 65, ON/OFF 205 of the switch 61, ON/OFF 206 of the switch 62, emission timing 207 of the light-emitting area 4*a* in the IRED 4, emission timing 208 of the light-emitting area 4*b* in the IRED 4, emission timing 209 of the light-emitting areas 4*c*, 4*d* in the IRED 4, and charging voltage 210 of the integrating capacitor 6. When the main power source of the camera is turned ON, and the release button of the camera is half-pushed, the power source voltage is supplied to the AFIC 10, whereby a range-finding operation is started.

Initially, in the following manner, the first correction beam is projected from the IRED 4, so as to determine the AF signal MAFDATA_S. Namely, the switch 65 is turned ON for a predetermined period, so that the integrating capacitor 6 is pre-charged until it attains a reference voltage $V_{REF}$. Also, the switch 61 is turned ON for a predetermined period, so that the integrating capacitor 6 is charged in excess only for this period until it attains a power source voltage $V_{CC}$. After the completion of pre-charging, the switch 65 is turned OFF.

After the pre-charging, the IRED 4 is driven by the driver 3 which is controlled by the CPU 1, so as to emit a predetermined number of pulses of infrared light only from the light-emitting area 4*a*. This infrared light becomes the first correction beam. The first correction beam projected from the IRED 4 is reflected by the object to be measured, and thus reflected light is received by the PSD 5. Then, the arithmetic circuit 14 outputs an output ratio signal $I_1/(I_1+I_2)$ for each of the emitted pulses of light, and the integrating circuit 15 inputs the output ratio signals therein. The CPU 1 controls the ON/OFF of the switch 60 at respective timings corresponding to the pulse light emissions of the IRED 4, so as to input respective negative voltages corresponding to the output ratio signals into the integrating capacitor 6.

The integrating capacitor 6 of the integrating circuit 15 inputs therein the output ratio signals outputted from the arithmetic circuit 14 and is discharged by respective voltage values corresponding to the values of the output ratio signals, thereby accumulating the output ratio signals. The voltage of the integrating capacitor 6 decreases stepwise every time the switch 60 is turned ON. This operation is referred to as "first integration." Though the amount of voltage drop in each step itself is distance information corresponding to the distance to the object to be measured, the sum of amounts of voltage drop obtained upon the individual pulses of light emission from the IRED 4 is taken as distance information in this embodiment.

After the input to the integrating capacitor 6 by a predetermined number of light emissions is completed, the switch 60 is kept at its OFF state, and the switch 62 is turned ON by a signal from the CPU 1. As a consequence, the integrating capacitor 6 is charted at a rate determined by the rating of the constant current source 63. This operation is referred to as "second integration." During the period of this second integration, the voltage of the integrating capacitor 6 and the reference voltage $V_{REF}$ are compared with each other in terms of magnitude. If it is determined that they coincide with each other, then the switch 62 is turned OFF, so as to stop charging the integrating capacitor 6. The CPU 1 measures the time required for the second integration, i.e., the time during which the switch 62 is in its ON state. Since the charging rate effected by the constant current source 4 is constant, the sum of the output ratio signals inputted to the integrating capacitor 6 upon one range-finding operation, i.e., AF signal MAFDATA_S, is determined from the time required for the second integration.

Subsequently, the reference beam is projected from the IRED 4, so as to determine the AF signal MAFDATA_M. At this time, the switch 65 is also turned ON for a predetermined period, so that the integrating capacitor 6 is pre-charged until it attains the reference voltage $V_{REF}$. Also, the switch 61 is turned ON for a predetermined period, so that the integrating capacitor 6 is charged in excess only for this period until it attains the power source voltage $V_{CC}$. Thereafter, the IRED 4 is driven by the driver 3 which is controlled by the CPU 1, so as to emit a predetermined number of pulses of infrared light only from the light-emitting areas 4*a* and 4*b*. This infrared light becomes the reference beam. Subsequent operations are similar to those in the case of the first correction beam.

Finally, the second correction beam is projected from the IRED 4, so as to determine the AF signal MAFDATA_L. At this time, the switch 65 is also turned ON for a predetermined period, so that the integrating capacitor 6 is pre-charged until it attains the reference voltage $V_{REF}$. Also, the switch 61 is turned ON for a predetermined period, so that the integrating capacitor 6 is charged in excess only for this period until it attains the power source voltage $V_{CC}$. Thereafter, the IRED 4 is driven by the driver 3 which is controlled by the CPU 1, so as to emit a predetermined number of pulses of infrared light from all the light-emitting areas 4*a* to 4*d*. This infrared light becomes the second correction beam. Subsequent operations are similar to those in each of the cases of the first correction beam and reference beam.

When the AF signals MAFDATA_S, MAFDATA_M, and MAFDATA_L are thus determined; then, according to steps S21 to S30 in the flowchart of FIG. 29, the AF signal K_AFDATA in which the beam eclipse correction has been carried out, or a weighted and averaged AF signal is determined. Further, according to the resulting AF signal, a distance signal is determined. Then, when the release button is completely pushed, the CPU 1 controls the lens driving circuit 7 according to thus determined distance signal, so as to cause the taking lens 8 to effect an appropriate focusing operation, and also opens a shutter (not depicted) so as to effect exposure.

Here, it is preferred that the integration time in the integrating circuit 15 in each of the respective cases where the beam projected from the IRED 4 is the first and second correction beams be shorter than the integration time in the integrating circuit 15 in the case where the beam projected from the IRED 4 is the reference beam. Here, the integration time is the sum of periods of individual accumulating operations (periods during which the switch 60 is in its ON state) in the first integration. If the period of each accumulating operation is constant, then the integration time is the product of the period of each integrating operation and the number of accumulating operations (the number of times when the switch 60 is turned ON). In general, the longer is the integration time, the better becomes the accuracy in the AF signal obtained. For example, with the period of each accumulating operation being kept constant, let the number of accumulating operations for the reference beam be 352, and the number of accumulating operations for each of the first and second correction beams be 44. Thus, the accuracy in AF signal MAFDATA_M which becomes a basis for the beam eclipse correction can be enhanced as the integration time for the reference beam is thus made longer, whereas the total range-finding time can be shortened as the integration time for each of the first and second correction beams is made shorter.

Also, it is preferable that the charging time of the integrating capacitor 6 (the period during which the switch 65 is turned ON) in each of the respective cases where the second and third beams (the reference beam and second correction beam in FIG. 48) are projected from the IRED 4 be shorter than the charging time of the integrating capacitor 6 in the case where the first beam (the first correction beam in FIG. 48) is projected from the IRED 4. It is also preferred that the integrating capacitor 6 be charged only when the first beam is projected, without charging the integrating capacitor 6 in each of the respective cases where the second and third beams are projected. It is because of the fact that, since the integrating capacitor 6 has been charged with the reference voltage at the time when the second integration is completed, it is not necessary to charge the integrating capacitor 6 during the time when each of the second and third beams is projected. Thus, by charging the integrating capacitor 6 for only a short period of time or not charging it at all for each of the respective times when the second and third beams are projected, the total range-finding time can be shortened.

The rangefinder apparatus explained in the foregoing is suitably employed in a camera and is equipped with the finder 9. The finder 9 is used for the photographer to visually identify the range of the image of the object formed by the taking lens 8, and also for the photographer to visually identify with reference to a target mark the position of each beam projected from the IRED 4 to the object to be measured. If the size of the target mark is determined according to the size of the second correction beam having a wide light-emitting area, then errors in the target mark alignment effected by the photographer become greater. Therefore, in this embodiment, the size of the target mark is determined according to the size of the reference beam.

Figure 49:
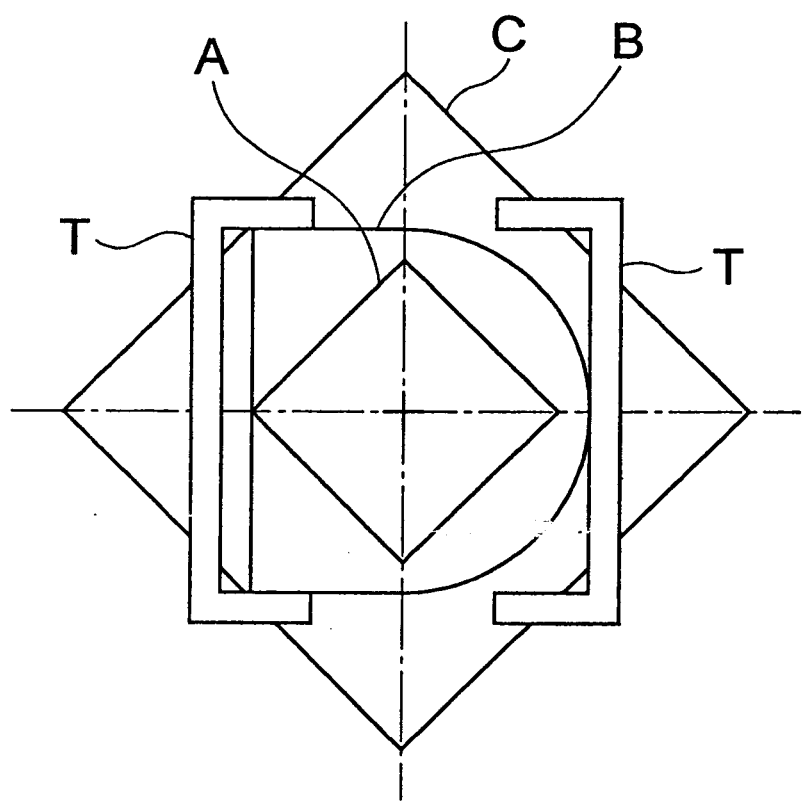
FIG. 49 is a view for explaining respective forms of the reference beam, first correction beam, and second correction beam projected from the IRED to the object to be measured, and of a target mark.

FIG. 49 is a view for explaining the respective forms of the reference beam, first correction beam, and second correction beam projected from the IRED 4 to the object to be measured, and of the target mark as seen by the photographer through the finder 9. In this drawing, A indicates the form of the first correction beam projected to the object as seen by the photographer through the finder 9. B indicates the form of the reference beam projected to the object as seen by the photographer through the finder 9. C indicates the form of the second correction beam projected to the object as seen by the photographer through the finder 9. T indicates the form of the target mark as seen by the photographer through the finder 9. Here, if each beam is infrared light, the photographer cannot see the beam projected to the object in practice. As shown in this drawing, the size of the target mark seen by the photographer through the finder 9 is made substantially the same as that of the reference beam projected to the object. If the target mark thus has a size corresponding to that of the reference beam projected from the IRED 4 to the object, the photographer can securely capture the aimed object in focus.

Without being restricted to the above-mentioned embodiment, the present invention can be modified in various manners. For example, though the beam eclipse correction is carried out according to an AF signal outputted from the AFIC 10 in the above-mentioned embodiment, it may be carried out according to a distance signal converted from the AF signal by carrying out a predetermined arithmetic operation. A certain constant distance or longer may be determined infinity, so that the distance is set (rounded) to a predetermined value. If the beam eclipse correction is carried out according to the rounded distance signal, however, it cannot be effected accurately. Therefore, it is preferable that the beam eclipse correction be carried out according to the distance signal before rounding.

Also, though the beams projected from the IRED 4 to the object to be measured have three kinds of forms in the above-mentioned embodiment as shown in each of FIGS. 7 and 35, forms of individual beams and the number of kinds thereof should not be restricted thereto.

In accordance with the present invention, as explained in detail in the foregoing, the reference beam, the first correction beam, and the second correction beam having an identical emission center-of-gravity position with respect to the base-length direction and respective emission light intensity distributions different from each other are successively projected from the light-projecting section toward the object to be measured. The reflected light of each beam projected to the object by the light-projecting section is received by the light-receiving section at the light-receiving position corresponding to the distance to the object, and distance information corresponding to the light-receiving position is outputted therefrom. Then, the correcting means determines a correction value by correcting the beam eclipse with reference to a correction expression according to respective distance information items outputted from the light-receiving section when the beam projected from the light-projecting section is the reference beam, the first correction beam, and the second correction beam, and adds the correction value to the distance information outputted from the light-receiving section when the projected beam is the reference beam, so as to determine the distance to the object.

Since the beam eclipse correction is carried out according to the respective distance information items obtained in response to the reference beam, first correction beam, and second correction beam mentioned above, accurate range-finding can be carried out even when a beam eclipse is generated. Also, even if the base-length distance between the light-projecting section and the light-receiving section is short, and the fluctuation in center-of-gravity position of the received light beam caused by the beam eclipse is large, accurate range-finding can be carried out according to the beam eclipse correction. Therefore, the base-length distance can be shortened, and the rangefinder apparatus and the camera mounted therewith can be made smaller. Also, since the distance between the light-emitting device in the light-projecting section and the light-projecting lens can be made shorter, so that the F number of the light-projecting lens can be made smaller, the rangefinder apparatus and camera can be made smaller in view of this point as well.

In particular, if the emission light intensity distribution of at least one of the reference beam, the first correction beam, and the second correction beam with respect to the base-length direction is asymmetrical about the emission center-of-gravity position, then the angular range where the beam eclipse correction is appropriately carried out can be widened in a laterally symmetrical manner.

In the case where the correction expression is determined beforehand according to a correlation value (e.g. difference) among distance information items outputted from the light-receiving section with respect to respective light-projecting angles of the reference beam, first correction beam, and second correction beam projected from the light-projecting section; the beam eclipse correction is appropriately effected in the correcting means. In particular, if the correction expression comprises a plurality of correction expressions different from each other in respective partial ranges into which a range available by the correlation value is divided, or the correcting means selects one of a plurality of expressions different from each other in respective partial ranges with reference to switching standards different from each other according to whether the beam eclipse is generated on the right side or left side, then an accurate beam eclipse correction is possible.

In the case where the correcting means corrects the beam eclipse only if the difference between respective distance information items outputted from the light-receiving section when the beam projected from the light-projecting section is the reference beam, the first correction beam, and the second correction beam is not smaller than a first reference value; unnecessary corrections are not effected, whereby the processing time is shortened, or the range-finding error would not increase upon carrying out corrections. Also, in the case where weighted-averaging means is further provided so as to weight, if the above-mentioned difference is smaller than the first reference value, two or more distance information items among respective distance information items outputted from the light-receiving section when the beam projected from the light-projecting section is the reference beam, the first correction beam, and the second correction beam according to respective emission light intensities of the beams, so as to attain a weighted average; unnecessary corrections are not effected, whereby the processing time is shortened, and the range-finding accuracy would improve.

In the case where the correcting means adds the correction value to the distance information outputted from the light-receiving section in response to the reference beam only when the correction value is not greater than a second reference value, so as to determine the distance to the object; the beam eclipse correction is effected only when the correction value is within an appropriate range, whereby the correction is prevented from operating erroneously. In particular, it is preferable that the second reference value be set with reference to the distance to the object obtained according to the result yielded when the correction value is added to the distance information outputted from the light-receiving section in response to the reference beam. In this case, the correction is further effectively prevented from operating erroneously.

In the case where the correcting means carries out the beam eclipse correction according to distance information before being rounded to a predetermined value even if the distance to the object is at a predetermined distance or longer, an accurate beam eclipse correction can be effected.

In the case where the light-projecting section lastly projects one of the first and second correction beams, it can be determined whether or not the beam eclipse correction is necessary before projecting the above-mentioned one beam. If not, then it is unnecessary to project the above-mentioned one beam, whereby the range-finding time can be shortened.

It is preferred that respective integration times in the integrating means when the beam projected from the light-projecting section is the first and second correction beams be shorter than the integration time in the integrating means when the beam projected from the light-projecting section is the reference beam. In this case, the accuracy of beam eclipse correction can be enhanced as the integration time for the reference beam is elongated, and the total range-finding time can be shortened as the integration time for each of the first and second correction beams is shortened.

It is also preferable that charging means for charging, before the integration by the integrating means, the integrating capacitor with the reference voltage or excessively charging the integrating capacitor with a voltage higher than the reference voltage and then charging it with the reference voltage be further provided such that, at each of times when second and third beams among the reference beam, the first correction beam, and the second correction beam are projected from the light-projecting section, the charging means does not charge the integrating capacitor at all or charges the integrating capacitor for a time shorter than the charging time of the integrating capacitor by the charging means when the first beam is projected from the light-projecting section. The total range-finding time can be shortened in this case as well.

In the case where there is further provided a finder, having a target mark with a size corresponding to the size of the reference beam projected to the object from the light-projecting section, for visually identifying the position of each beam projected to the object from the light-projecting section according to the target mark, the photographer can securely capture the aimed object in focus.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

a light-projecting section for successively projecting toward an object at a distance to be measured a reference beam, a first correction beam, and a second correction beam having an identical emission center-of-gravity position with respect to a base-length direction and respective emission light intensity distributions different from each other;

a light-detecting section for detecting reflected light of the beam projected to the object from said light-projecting section at a light-detecting position corresponding to the distance to the object, and outputting distance information corresponding to the light-detecting position; and correcting means which determines a correction value by correcting a beam eclipse with reference to a correction expression according to respective distance information items output from said light-detecting section when the beam projected from said light-detecting section is the reference beam, the first correction beam, and the second correction beam, and adds the correction value to the distance information output from said light-detecting section when the projected beam is the reference beam, to determine the distance to the object.

2. The rangefinder apparatus according to claim 1, wherein the emission light intensity distribution of at least one of the reference beam, the first correction beam, and the second correction beam with respect to the base-length direction is asymmetrical about the emission center-of-gravity position.

3. The rangefinder apparatus according to claim 1, wherein the correction expression is determined beforehand according to a correlation value among distance information items output from said light-detecting section with respect to respective light-projecting angles of the reference beam, the first correction beam and the second correction beam projected from said light-projecting section.

4. The rangefinder apparatus according to claim 3, wherein the correction expression comprises a plurality of expressions different from each other in respective partial ranges into which a range available from the correlation value is divided.

5. The rangefinder apparatus according to claim 4, wherein said correcting means selects one of the plurality of expressions different from each other in respective partial ranges with reference to switching standards different from each other according to whether the beam eclipse is generated on a right side or a left side.

6. The rangefinder apparatus according to claim 1, wherein said correcting means corrects the beam eclipse only if a difference between respective distance information items output from said light-detecting section, when the beam projected from said light-projecting section is the reference beam, the first correction beam, and the second correction beam, is not smaller than a first reference value.

7. The rangefinder apparatus according to claim 6, further comprising weighted-averaging means for weighting, if the difference is smaller than the first reference value, at least two distance information items among respective distance information items output from said light-detecting section, when the beam projected from said light-projecting section is the reference beam, the first correction beam, and the second correction beam, according to respective emission light intensities of the beams, thereby attaining a weighted average.

8. The rangefinder apparatus according to claim 1, wherein said correcting means adds the correction value to the distance information output from said light-detecting section in response to the reference beam only when the correction value is not greater than a second reference value, to determine the distance to the object.

9. The rangefinder apparatus according to claim 8, wherein the second reference value is set with reference to the distance to the object obtained according to the result yielded when the correction value is added to the distance information output from said light-detecting section in response to the reference beam.

10. The rangefinder apparatus according to claim 1, wherein said correcting means carries out the beam eclipse correction according to distance information before being rounded to a predetermined value even if the distance to the object is at least a predetermined distance.

11. The rangefinder apparatus according to claim 1, wherein said light-projecting section lastly projects one of the first and second correction beams.

12. The rangefinder apparatus according to claim 1, wherein said light-detecting section comprises:
    light-detecting means for detecting reflected light of the beam projected to the object from said light-projecting section at a light-detecting position on a position sensitive detector corresponding to the distance to the object, and outputting a signal corresponding to the light-detecting position;
    arithmetic means for carrying out an arithmetic operation according to the signal output from said light-detecting means and outputting a signal corresponding to the distance to the object; and integrating means, having an integrating capacitor for charging and discharging in response to the signal output from said arithmetic means, and outputting distance information according to the integrating.

13. The rangefinder apparatus according to claim 12, wherein respective integration times in said integrating means when the beam projected from said light-projecting section is the first and second correction beams are shorter than the integration time in said integrating means when the beam projected from said light-projecting section is the reference beam.

14. The rangefinder apparatus according to claim 12, further comprising charging means for charging, before the integration by said integrating means, said integrating capacitor with a reference voltage or excessively charging said integrating capacitor with a voltage higher than the reference voltage and then charging said integrating capacitor with the reference voltage,
    wherein, when second and third beams among the reference beam, the first correction beam, and the second correction beam are projected from said light-projecting section, said charging means does not charge said integrating capacitor at all or charges said integrating capacitor for a time shorter than the charging time of said integrating capacitor by said charging means when the first beam is projected from said light-projecting section.

15. The rangefinder apparatus according to claim 1, further comprising a finder, having a target mark with a size corresponding to the size of the reference beam projected to the object from said light-projecting section, for visually identifying the position of each beam projected to the object from said light-projecting section according to said target mark.

* * * * *